US011182150B2

(12) United States Patent
Rathore et al.

(10) Patent No.: US 11,182,150 B2
(45) Date of Patent: Nov. 23, 2021

(54) ZERO PACKET LOSS UPGRADE OF AN IO DEVICE

(71) Applicant: Pensando Systems Inc., San Jose, CA (US)

(72) Inventors: Alok Rathore, Milpitas, CA (US); Krishna Doddapaneni, Cupertino, CA (US); Sarat Babu Kamisetty, Fremont, CA (US); Barun Halder, San Jose, CA (US); Hareesh Ramachandran, Bangalore (IN)

(73) Assignee: PENSANDO SYSTEMS INC., Milpitas, CA (US)

(*) Notice: Subject to any disclaimer, the term of this patent is extended or adjusted under 35 U.S.C. 154(b) by 119 days.

(21) Appl. No.: 16/742,631

(22) Filed: Jan. 14, 2020

(65) Prior Publication Data

US 2021/0216305 A1   Jul. 15, 2021

(51) Int. Cl.
*G06F 9/44* (2018.01)
*G06F 8/656* (2018.01)
*G06F 13/20* (2006.01)

(52) U.S. Cl.
CPC .............. *G06F 8/656* (2018.02); *G06F 13/20* (2013.01)

(58) Field of Classification Search
None
See application file for complete search history.

(56) References Cited

U.S. PATENT DOCUMENTS

| 5,761,518 A | 6/1998 | Boehling et al. |
| 6,212,634 B1 | 4/2001 | Geer, Jr. et al. |
| 8,069,293 B1 | 11/2011 | Rogan et al. |
| 8,307,095 B2 | 11/2012 | Clark et al. |

(Continued)

FOREIGN PATENT DOCUMENTS

| CN | 102222010 A | 10/2011 |
| CN | 105700967 A | 6/2016 |

(Continued)

OTHER PUBLICATIONS

PCT/US2018/066801 International Search Report and Written Opinion dated Apr. 2, 2019.

(Continued)

*Primary Examiner* — Qamrun Nahar
(74) *Attorney, Agent, or Firm* — Wilson Sonsini Goodrich & Rosati

(57) ABSTRACT

Described are platforms, systems, and methods for upgrading firmware on a programmable input output (IO) device. In one aspect, a method executed by the programmable IO device comprises: receiving, from a north-bound entity, a request to upgrade firmware installed on at least one CPU core; disabling flow-miss traffic to the at least one CPU core; redirecting the flow-miss traffic to an off-box service; providing a configuration for the programmable IO device to the off-box service; redirecting traffic to the off-box service; upgrading the firmware installed on the at least one CPU core; upgrading at least one program running in the data plane; reprograming a forwarding state provided by the off-box service; disabling the redirection of the traffic to the off-box service; and providing, to the north-bound entity, a notification indicating a completion of the upgrade.

40 Claims, 9 Drawing Sheets

(56) References Cited

U.S. PATENT DOCUMENTS

| | | | |
|---|---|---|---|
| 8,407,464 | B2 | 3/2013 | Salowey et al. |
| 8,413,238 | B1 | 4/2013 | Sutton |
| 8,418,166 | B2 | 4/2013 | Armstrong et al. |
| 8,695,075 | B2 | 4/2014 | Anderson et al. |
| 8,745,205 | B2 | 6/2014 | Anderson et al. |
| 9,143,504 | B1 | 9/2015 | Shi et al. |
| 9,239,840 | B1 | 1/2016 | Acharya |
| 9,479,338 | B2 | 10/2016 | Sabin |
| 9,648,137 | B1 | 5/2017 | Haynie et al. |
| 9,830,143 | B2 * | 11/2017 | Chigurapati ............ G06F 8/656 |
| 9,843,624 | B1 | 12/2017 | Taaghol et al. |
| 9,967,144 | B2 | 5/2018 | Kumarasamy et al. |
| 9,996,338 | B2 | 6/2018 | Dujmovic et al. |
| 10,908,895 | B2 | 2/2021 | Halder et al. |
| 2002/0065828 | A1 | 5/2002 | Goodspeed |
| 2002/0144108 | A1 | 10/2002 | Benantar |
| 2003/0149608 | A1 | 8/2003 | Kall et al. |
| 2007/0192863 | A1 | 8/2007 | Kapoor et al. |
| 2007/0261112 | A1 | 11/2007 | Todd et al. |
| 2008/0120498 | A1 | 5/2008 | Peterson et al. |
| 2009/0198689 | A1 | 8/2009 | Frazier et al. |
| 2010/0131646 | A1 | 5/2010 | Drako |
| 2010/0306816 | A1 | 12/2010 | McGrew et al. |
| 2012/0054730 | A1 | 3/2012 | Michishita |
| 2012/0072894 | A1 | 3/2012 | Wang et al. |
| 2012/0096250 | A1 | 4/2012 | Aloni et al. |
| 2012/0150805 | A1 | 6/2012 | Pafumi et al. |
| 2014/0258999 | A1 * | 9/2014 | Katihar ................. G06F 8/65 717/168 |
| 2014/0289331 | A1 | 9/2014 | Chan et al. |
| 2014/0304802 | A1 * | 10/2014 | Pope ............... H04L 63/1441 726/13 |
| 2015/0269383 | A1 | 9/2015 | Lang et al. |
| 2016/0036778 | A1 * | 2/2016 | Chen ............... H04L 63/0236 726/1 |
| 2016/0188313 | A1 | 6/2016 | Dubal et al. |
| 2016/0330230 | A1 | 11/2016 | Reddy et al. |
| 2016/0364231 | A1 * | 12/2016 | Tati ..................... G06F 8/656 |
| 2017/0006022 | A1 | 1/2017 | Gunti et al. |
| 2017/0242686 | A1 | 8/2017 | Vidyadhara et al. |
| 2017/0344703 | A1 | 11/2017 | Ansari et al. |
| 2018/0074837 | A1 * | 3/2018 | Zhang ..................... G06F 8/65 |
| 2018/0152540 | A1 | 5/2018 | Niell et al. |
| 2018/0356989 | A1 | 12/2018 | Meister et al. |
| 2020/0136836 | A1 | 4/2020 | Schiattarella et al. |
| 2020/0336316 | A1 | 10/2020 | Jain et al. |
| 2020/0356358 | A1 * | 11/2020 | Giri ........................ G06F 8/658 |

FOREIGN PATENT DOCUMENTS

| | | |
|---|---|---|
| WO | WO-2019133434 A1 | 7/2019 |
| WO | WO-2020092225 A1 | 5/2020 |
| WO | WO-2020132413 A1 | 6/2020 |
| WO | WO-2021146463 A1 | 7/2021 |

OTHER PUBLICATIONS

PCT/US2019/058324 Invitation to Pay Additional Fees dated Dec. 27, 2019.

PCT/US2019/058324 International Search Report and Written Opinion dated Feb. 25, 2020.

Agilio Software. Agilio® OVS Software Architecture, 2016, Netronome Systems (2016).

PCT/US2019/067791 International Search Report and Written Opinion dated Apr. 28, 2020.

PCT/US2019/067791 Invitation to Pay Additional Fees dated Feb. 21, 2020.

PCT/US2021/013489 International Search Report and Written Opinion dated Apr. 22, 2021.

Saghir et al. Datapath and ISA Customization for Soft VLIW Processors. IEEE (2006).

U.S. Appl. No. 16/230,550 Office Action dated Mar. 27, 2020.

Weppenaar et al. Intelligent Maintenance Management In A Reconfigurable Manufacturing Environment Using Multi-Agent Systems, Thesis Jul. 2010, Central University of Technology (2010).

Zellweger et al. Decoupling Cores, Kernels, and Operating Systems. 11th USENIX Symposium on Operating Systems Design and Implementation (OSDI '14) pp. 17-31 (Oct. 2014).

U.S. Appl. No. 16/173,441 Office Action dated Jun. 23, 2020.

* cited by examiner

ZERO PACKET LOSS UPGRADE OF AN IO DEVICE

BACKGROUND

Network traffic refers to the amount of data moving across a network at a given point of time. Network data is mostly encapsulated in network packets, which provide the load in the network. Network traffic is the main component for network traffic measurement, network traffic control, and simulation. The proper organization of network traffic helps in ensuring the quality of service in a given network.

SUMMARY

Computing environments may include hosts such as servers, computers running one or more processes, such as virtual machines or containers. The hosts and/or processes may be configured to communicate with other processes or devices over a computing network. The host systems interface with the computing network via input/output (IO) devices (e.g., network interface cards (NICs)).

Computer systems interface to IO devices through a specified set of device registers and memory-based data structures. These registers and data structures are usually fixed for a given IO device, allowing a specific device driver program to run on the computer system and control the IO device. In a data communication network, network interfaces are normally fixedly defined control structures, descriptors, registers and the like. Networking data and control structures are memory based and access memory using direct memory access (DMA) semantics. Network systems such as switches, routing devices, receive messages or packets at one of a set of input interfaces and forward them on to one or more of a set of output interfaces. Users typically require that such routing devices operate as quickly as possible in order to keep pace with a high rate of incoming messages. One challenge associated with network systems relates to providing flexible network interfaces so as to adapt to changes in the network device structure and feature set, various protocols, operating systems, applications, and the rapid development of device models.

Communications service providers are investing heavily in large and hyper-scale data centers to deliver content, data processing, and communications services. The applications delivering these services must have access to high-speed storage and networking, be secure, and run in a virtualized environment based on software-defined networking (SDN). Virtualization software, load balancing, encryption, deep packet inspection (DPI), and packet processing all require many central processing unit (CPU) cycles and can tie up multiple processor cores, reducing the number of cores available for applications.

A NIC is a Peripheral Component Interconnect Express (PCIe) expansion card that plugs into a server or storage box to enable connectivity to an Ethernet network. Traditional NICs support offload of CPU functions, such as checksum and segmentation. However, with the recent tectonic shift in cloud data center networking driven by SDN and network functions virtualization (NFV), a new class of offload NIC is needed. More specifically, the complexity of the server-based networking data plane has increased dramatically with the introduction of overlay tunneling protocols, such as virtual extensible local-area network (VXLAN), and virtual switching with complex actions. Additionally, increasing network interface bandwidths mean that performing these functions in software creates an untenable load on the CPU resources, leaving little or no CPU left over to run applications. Moreover, a key requirement of SDN is that the networking data plane must remain fungible, so fixed-function offload technologies cannot be applied.

A smartNIC (also known as an intelligent server adapter (ISA)) goes beyond simple connectivity and implements network traffic processing on the NIC that would necessarily be performed by the CPU in the case of a foundational NIC. SmartNICs can be employed in cloud data center servers to boost performance by offloading operations of the CPUs of the servers by performing network datapath processing through an IO subsystem. For example, the IO subsystem provided through a SmartNIC offloads low-level operations from server CPUs to dramatically increasing network and application performance. By installing smartNICs, communications service providers can deliver significantly better revenue-earning services with a small increase in investment.

With the increase in the complexity of networks and the protocols which run on them, the amount of processing that hosts must perform for networking operations has increased exponentially. This problem is amplified because of as requirement for more network bandwidth grows so does the need for precious host CPU time. As such, ISAs are increasingly deployed in datacenters to offload these complex networking tasks away from the host CPU. This allows more CPU available to the applications on the host. ISAs include a capacity to a large amount of state data that can be used to provide advanced services. ISAs are usually presented to the host as a PCIe device but can also be involved in offloading host CPU tasks as a bump-in-the-wire ethernet device. The advanced functions can be host agnostic as a host usually uses off the rack drivers to communicate with these devices. ISA devices can be managed separately from the hosts by administrators who are not necessarily the same as the host administrators.

Upgrade of these ISA devices is necessary to consume more features and/or to provide critical bug fixes. Such upgrades can be achieved by bringing the host down or bringing the host link down, thus affecting the availability of the host. Thus, it is highly desirable to achieve software upgrade of these ISA devices with zero packet loss during the upgrade window. In some embodiments, upgrading of an ISA device is especially difficult because of the large state they have and non-support from host side. This problem is complicated by low timeouts for PCIe transactions, low downtime requirements and high frequency of IO operations. Moreover, typically in large-scale deployments, there is not enough memory available on the ISA device itself to be able to create a duplicate copy of the entire state in new format. Additionally, in many cases, there exists a requirement to not cause any disruption to traffic or to any apps running on the host (e.g., ensure no host reload). Also, the upgrade process is further complicated by independent actors such as drivers, operating systems, and applications, which are (by definition of hitless upgrade) unaware of the upgrade and need to continue without interruption.

Typically, upgrading the firmware of an IO subsystem (provided through e.g., a smartNIC) entails some amount of traffic disruption. Existing solutions involve bringing a link down, thereby causing all existing sessions to be reset. Also, the upgrade is initiated by the host itself and thus causes packet loss.

Described herein, in certain embodiments, are zero-packet-loss upgrade systems employing an IO device to ensure that firmware can be upgraded without losing any packets in the network. In some embodiments, the described zero-packet-loss upgrade system utilizes the separation between control plane code and data plane code. In some embodiments, an application programming interface (API) is provided to read/write traffic's forwarding state into the IO subsystem's memory. In some embodiments, the described zero-packet-loss upgrade system includes a module that redirects traffic to an off-box service. In some embodiments, such an off-box service makes decisions to apply policies on received traffic during, for example, an upgrade window. In some embodiments, these policies are configured by a north-bound entity, such as a controller or controller like entity. Generally, a north-bound entity allows a component of a network to communicate with a higher-level component, and conversely, a southbound interface allows a network component to communicate with a lower-level component.

In some embodiments, the described zero-packet-loss upgrade system employs a programmable IO device, such as a smartNIC, that provides a flexible and fully programmable interface mechanism such that the IO device can be customized to ensure that an IO subsystem's code/firmware can be upgraded without losing any packets. In some embodiments, the employed programmable IO device includes a highly configurable network pipeline, a customizable host interface, and flexible hardware offloads for storage, security, and network functions with improved performance and within target power budgets. In some embodiments, the programmable IO device provides a device interface that is programmable in the form of device data structures and control registers. In some embodiments, the interface provided by the employed programmable IO device allows the device to emulate existing host software drivers and to interact efficiently with various software drivers.

The described zero-packet-loss upgrade system ensures stateful upgrade of ISA containing large state information. The function of an ISA is usually split into two parts: a control plane and a data plane. In some embodiments, the control plane includes the management and control applications. In some embodiments, the control plane includes agents that allow for communication with the external world, outside of the view of the host. In some embodiments, includes logic for forwarding data and may programmable. In some embodiments, the zero-packet-loss upgrade system includes and ISA that is presented to the host as a PCIe device or is connected to a host as an ethernet device in a bump-in-the-wire configuration.

The performance of the IO device may be improved by replacing the conventional fixed function direct memory access (DMA) engine, control registers and device state machines with a programmable pipeline of match, action and DMA stages. For example, a stage in the pipeline may initiate DMA read and write operations to the host system, fetching memory-based descriptors, scatter gather lists (SGL), or custom data structure which describe I/O operations. The provided interface mechanism may comprise describing host computer data structures using a stack of fields which map to the data structures (e.g., descriptor is used to describe how a packet is made, different types of packets); storing internal DMA engine state in programmable match tables which can be updated by the hardware pipeline (e.g., match processing unit (MPU)) as well as by the host processor; describing device registers by a separate of programmable field definitions and backed by hardware mechanisms through address remapping mechanisms. The above interface mechanism enables the IO device to directly interact with host data structures without the assistance of the host system thus allowing lower latency and deeper processing in the IO device.

In some embodiments, interface provided by the employed IO device interface includes a highly optimized ring-based IO queue interface. Such a ring-based IO queue interface may include an efficient software programming model to deliver high performance with, for example, CPU and PCIe bus efficiency. In some embodiments, the programmable IO device is communicably coupled to a processor of a host computer system via a PCIe bus. In some embodiments, the IO device interfaces to a host system via one or more (e.g., one to eight) physical PCIe interfaces.

In some embodiments, the described zero-packet-loss upgrade system may employ the IO device to break down packet processing tasks into a series of table lookups or matches, with respective processing actions. In some embodiments, the IO device includes a MPU that performs table-based actions in each stage of a network pipeline. For example, one or more MPUs may be combined with a table engine, which is configured to extract a programmable set of fields and fetch a table result. Once the table engine has completed fetching the lookup result, the table engine may deliver the table result and relevant packet header fields to an MPU for processing. In some embodiments, the MPU may run a targeted program based on a domain specific instruction set and the MPU may take the table lookup result and packet headers as inputs and produce table updates and packet header rewrite operations as outputs. In some embodiments, a pre-determined number of such table engines and MPU pipeline stages may be combined to form a programmable pipeline that is capable of operating at a high rate of packet processing. This prevents the MPUs from experiencing a data miss stall and allows the MPU programs executed in a deterministic time, then pipelined together to maintain a target packet processing rate. In some cases, the programmer or compiler may decompose the packet processing program into a set of dependent or independent table lookup and action processing stages (match+action) which are mapped onto the table engine and MPU stages respectively. In some embodiments, when the required number of stages exceeds the implemented number of stages, a packet may be recirculated for additional processing.

Accordingly, in one aspect, disclosed herein is a programmable IO device. The programmable IO device comprising: at least one CPU core; and a memory unit. The memory unit having instructions stored thereon which, when executed by the programmable IO device, cause the programmable IO device to perform operations comprising: receiving, from a north-bound entity, a request to upgrade firmware installed on the programmable IO device; disabling flow-miss traffic to the programmable IO device; redirecting the flow-miss traffic to an off-box service; providing a configuration for the programmable IO device to the off-box service; redirecting traffic to the off-box service; updating the firmware installed on the programmable IO device; reprograming a forwarding state provided by the off-box service; disabling the redirection of the traffic to the off-box service; and providing, to the north-bound entity, a notification indicating a completion of the upgrade of the firmware. In some embodiments, the programmable IO device is an ISA. In some embodiments, the north-bound entity comprises a controller. In some embodiments, the operations are executed through a controller agent running on one of the CPU cores. In some embodiments, the operations are executed via an API provided by a software development kit (SDK). In some embodiments, the off-box service is provided by a server device. In some embodiments, the server device does not comprise the programmable IO device. In some embodiments, the north-bound entity comprises a controller. In some embodiments, the controller is provided by a server device. In some embodiments, the server device does not comprise the programmable IO device. In some embodiments, the off-box service is provided by the server device. In some embodiments, the configuration comprises entries from a stateful table and entries from a stateless table. In some embodiments, the operations comprise: before providing the configuration to the off-box service, fetching the entries from either the stateful table or the stateless table. In some embodiments, the entries from either the stateful table or the stateless table are provided in a well-defined format. In some embodiments, a redirecting program running in the data plane responsible for redirecting traffic to the off-box service and traffic received from the off-box service to a network is not affected during the execution of the operations. In some embodiments, the redirecting program is upgraded after the execution the operations. In some embodiments, the operations comprise: periodically providing, to the north-bound entity, status updates regarding the upgrade of the firmware to track the health of the programmable IO device during the upgrade. In some embodiments, the north-bound entity is configured to trigger the off-box service to start managing the traffic forwarding and to accept in-coming configurations when a fault state is detected based on the provided status updates. In some embodiments, disabling the flow-miss traffic to the programmable IO device and redirecting the flow-miss traffic to the off-box service are performed as an atomic operation. In some embodiments, the firmware is stored in the memory unit before receiving the request to upgrade the firmware. In some embodiments, the forwarding state comprises hardware tables that are saved in static random access memory (SRAM), ternary content addressable memory (TCAM), or high bandwidth memory (HBM). In some embodiments, the forwarding state comprises assembly programs loaded in HBM program memory. In some embodiments, the operations comprise: after updating the firmware, upgrading at least one program running in the data plane. In some embodiments, the at least one CPU core comprises an advanced RISC machine (ARM) processor.

In a related yet separate aspect, disclosed herein is a method for upgrading firmware on a programmable IO device. The method executed by the programmable IO device and comprising: receiving, from a north-bound entity, a request to upgrade firmware installed on the programmable IO device; disabling flow-miss traffic to the programmable IO device; redirecting the flow-miss traffic to an off-box service; providing a configuration for the programmable IO device to the off-box service; redirecting traffic to the off-box service; updating the firmware installed on the programmable IO device; reprograming a forwarding state provided by the off-box service; disabling the redirection of the traffic to the off-box service; and providing, to the north-bound entity, a notification indicating a completion of the upgrade of the firmware. In some embodiments, the programmable IO device is an ISA. In some embodiments, the north-bound entity comprises a controller. In some embodiments, the method is through a controller agent running on one of the CPU cores. In some embodiments, the method is executed via an API provided by a SDK. In some embodiments, the off-box service is provided by a server device. In some embodiments, the server device does not comprise the programmable IO device. In some embodiments, the north-bound entity comprises a controller. In some embodiments, the controller is provided by a server device. In some embodiments, the server device does not comprise the programmable IO device. In some embodiments, the off-box service is provided by the server device. In some embodiments, the configuration comprises entries from a stateful table and entries from a stateless table. In some embodiments, method comprises: before providing the configuration to the off-box service, fetching the entries from either the stateful table or the stateless table. In some embodiments, the entries from either the stateful table or the stateless table are provided in a well-defined format. In some embodiments, a redirecting program running in the data plane responsible for redirecting traffic to the off-box service and traffic received from the off-box service to a network is not affected during the execution of the method. In some embodiments, the redirecting program is upgraded after the execution the method. In some embodiments, the method comprises: periodically providing, to the north-bound entity, status updates regarding the upgrade of the firmware to track the health of the programmable IO device during the upgrade. In some embodiments, the north-bound entity is configured to trigger the off-box service to start managing the traffic forwarding and to accept in-coming configurations when a fault state is detected based on the provided status updates. In some embodiments, disabling the flow-miss traffic to the programmable IO device and redirecting the flow-miss traffic to the off-box service are performed as an atomic operation. In some embodiments, the firmware is stored in the memory unit before receiving the request to upgrade the firmware. In some embodiments, the forwarding state comprises hardware tables that are saved in SRAM, TCAM, or HBM. In some embodiments, the forwarding state comprises assembly programs loaded in HBM program memory. In some embodiments, the method comprises: after updating the firmware, upgrading at least one program running in the data plane. In some embodiments, the at least one CPU core comprises an ARM processor.

In a related yet separate aspect, disclosed herein is a system comprising a north-bound entity; an off-box service; and a programmable IO device. The programmable IO device configured to execute instructions that cause the programmable IO device to perform operations comprising: receiving, from the north-bound entity, a request to upgrade firmware installed on the programmable IO device; disabling flow-miss traffic to the programmable IO device; redirecting the flow-miss traffic to an off-box service; providing a configuration for the programmable IO device to the off-box service; redirecting traffic to the off-box service; updating the firmware installed on the programmable IO device; reprograming a forwarding state provided by the off-box service; disabling the redirection of the traffic to the off-box service; and providing, to the north-bound entity, a notification indicating a completion of the upgrade of the firmware. In some embodiments, the programmable IO device is an ISA. In some embodiments, the north-bound entity comprises a controller. In some embodiments, the operations are executed through a controller agent running on one of the CPU cores. In some embodiments, the operations are executed via an API provided by an SDK. In some embodiments, the off-box service is provided by a server device. In some embodiments, the server device does not comprise the programmable IO device. In some embodiments, the north-bound entity comprises a controller. In some embodiments, the controller is provided by a server device. In some embodiments, the server device does not comprise the programmable IO device. In some embodiments, the off-box service is provided by the server device.

In some embodiments, the configuration comprises entries from a stateful table and entries from a stateless table. In some embodiments, the operations comprise: before providing the configuration to the off-box service, fetching the entries from either the stateful table or the stateless table. In some embodiments, the entries from either the stateful table or the stateless table are provided in a well-defined format. In some embodiments, a redirecting program running in the data plane responsible for redirecting traffic to the off-box service and traffic received from the off-box service to a network is not affected during the execution of the operations. In some embodiments, the redirecting program is upgraded after the execution the operations. In some embodiments, the operations comprise: periodically providing, to the north-bound entity, status updates regarding the upgrade of the firmware to track the health of the programmable IO device during the upgrade. In some embodiments, the north-bound entity is configured to trigger the off-box service to start managing the traffic forwarding and to accept in-coming configurations when a fault state is detected based on the provided status updates. In some embodiments, disabling the flow-miss traffic to the programmable IO device and redirecting the flow-miss traffic to the off-box service are performed as an atomic operation. In some embodiments, the firmware is stored in the memory unit before receiving the request to upgrade the firmware. In some embodiments, the forwarding state comprises hardware tables that are saved in SRAM, TCAM, or HBM. In some embodiments, the forwarding state comprises assembly programs loaded in HBM program memory. In some embodiments, the operations comprise: after updating the firmware, upgrading at least one program running in the data plane. In some embodiments, the at least one CPU core comprises an ARM processor.

In a related yet separate aspect, disclosed herein is a programmable IO device comprising: at least one CPU core; and a memory unit is provided. The memory unit partitioned into a standby partition and an active partition. The active partition comprises resources used by a forwarding plane to assist with forwarding decisions. The memory unit having instructions stored thereon which, when executed by the programmable IO device, cause the programmable IO device to perform operations comprising: loading a firmware update to the standby partition; receiving, from a north-bound entity, a request to upgrade to the firmware update; programing a forwarding state to the standby partition; disabling incoming configuration updates; quiescing the forwarding plane; reprograming program pointers to reference to the firmware update and a network state stored to the standby partition; un-quiescing the forwarding plane; and enabling incoming configuration updates. In some embodiments, the programmable IO device is an ISA. In some embodiments, the north-bound entity comprises a controller. In some embodiments, the forwarding state is managed by the controller via a controller agent. In some embodiments, the controller is provided by a server device. In some embodiments, the server device does not comprise the programmable IO device. In some embodiments, the resources used by the forwarding plane comprise forwarding tables and assembly programs. In some embodiments, the active forwarding tables includes entries in a traffic flow table for each respective flow. In some embodiments, an entry in one of the forwarding tables includes include information related to a respective flow. In some embodiments, entries in the forwarding tables include information regarding a location of an offset for a respective assembly program. In some embodiments, the memory unit comprises: SRAM, TCAM, or HBM, partitioned into the standby partition and the active partition. In some embodiments, when the firmware update does not have any forwarding data-structure changes, the active partition is used instead of the standby partition during the execution of the operations.

In a related yet separate aspect, disclosed herein is a method for upgrading firmware on a programmable IO device. The method executed by the programmable IO device and comprising: loading a firmware update to a standby partition of a memory unit, the memory unit partitioned into the standby partition and an active partition, wherein the active partition comprises resources used by a forwarding plane to assist with forwarding decisions; receiving, from a north-bound entity, a request to upgrade to the firmware update; programing a forwarding state to the standby partition; disabling incoming configuration updates; quiescing the forwarding plane; reprograming program pointers to reference to the firmware update and a network state stored to the standby partition; un-quiescing the forwarding plane; and enabling incoming configuration updates. In some embodiments, the programmable IO device is an ISA. In some embodiments, the north-bound entity comprises a controller. In some embodiments, the forwarding state is managed by the controller via a controller agent. In some embodiments, the controller is provided by a server device. In some embodiments, the server device does not comprise the programmable IO device. In some embodiments, the resources used by the forwarding plane comprise forwarding tables and assembly programs. In some embodiments, the active forwarding tables includes entries in a traffic flow table for each respective flow. In some embodiments, an entry in one of the forwarding tables includes include information related to a respective flow. In some embodiments, entries in the forwarding tables include information regarding a location of an offset for a respective assembly program. In some embodiments, the memory unit comprises: SRAM, TCAM, or HBM, partitioned into the standby partition and the active partition. In some embodiments, when the firmware update does not have any forwarding data-structure changes, the active partition is used instead of the standby partition during the execution of the operations.

It shall be understood that different aspects of the described system can be appreciated individually, collectively, or in combination with each other. Various aspects of the systems described herein may be applied to any of the particular applications set forth below or for any other types of the data processing system disclosed herein. Any description herein concerning the data processing may apply to and be used for any other data processing situations. Additionally, any embodiments disclosed in the context of the data processing system or apparatuses are also applicable to the methods disclosed herein.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
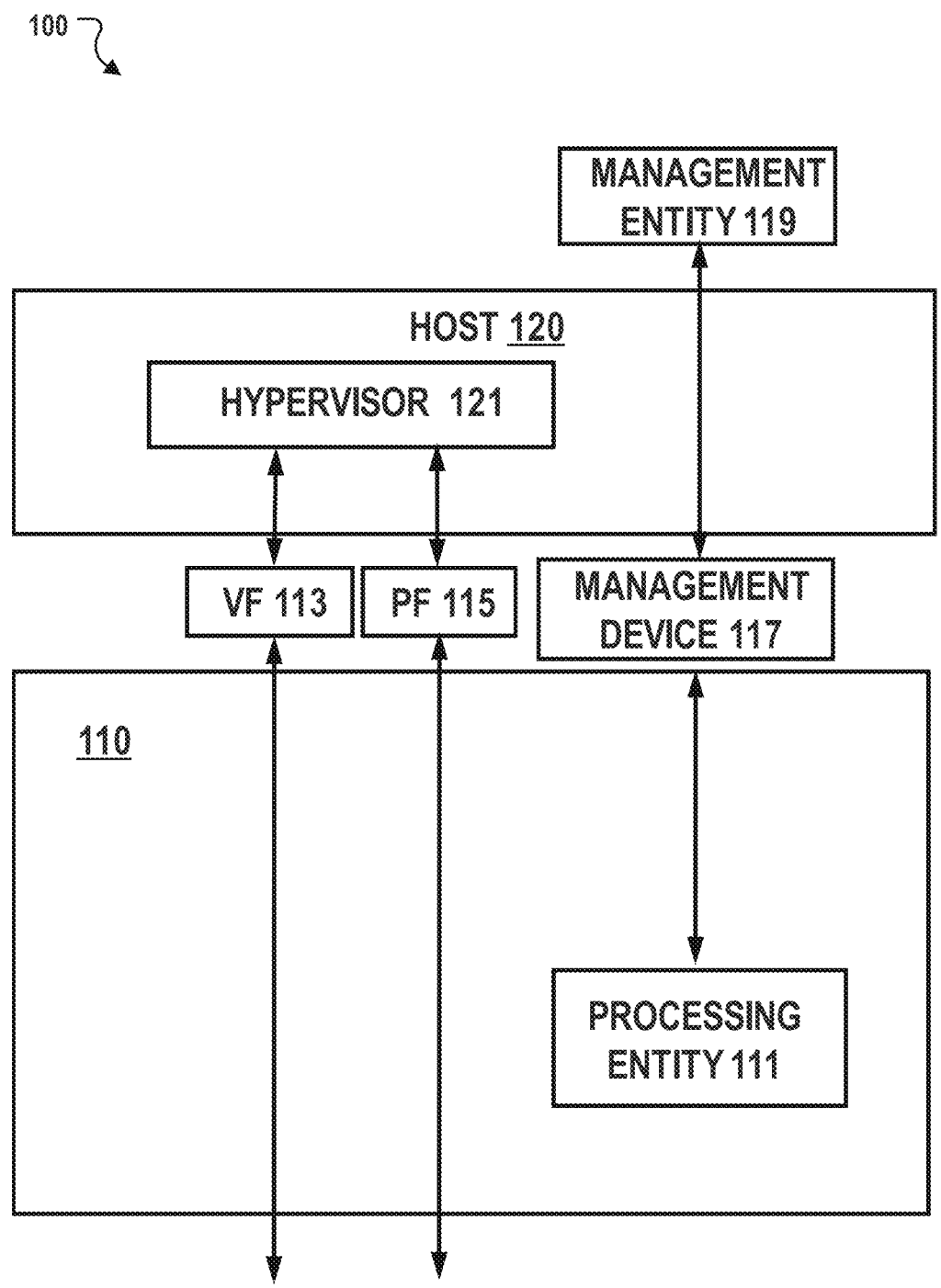
FIG. 1 depicts a non-limiting example a computing system architecture that may be employed by embodiments of the present disclosure.

Described herein, in certain embodiments, are programmable IO devices comprising: at least one CPU core; and a memory unit. The memory unit having instructions stored thereon which, when executed by the programmable IO device, cause the programmable IO device to perform operations comprising: receiving, from a north-bound entity, a request to upgrade firmware installed on the programmable IO device; disabling flow-miss traffic to the programmable IO device; redirecting the flow-miss traffic to an off-box service; providing a configuration for the programmable IO device to the off-box service; redirecting traffic to the off-box service; updating the firmware installed on the programmable IO device; reprograming a forwarding state provided by the off-box service; disabling the redirection of the traffic to the off-box service; and providing, to the north-bound entity, a notification indicating a completion of the upgrade of the firmware.

Also described herein, in certain embodiments, are methods for upgrading firmware on a programmable IO device. The methods executed by the respective programmable IO device and comprising: receiving, from a north-bound entity, a request to upgrade firmware installed on the programmable IO device; disabling flow-miss traffic to the programmable IO device; redirecting the flow-miss traffic to an off-box service; providing a configuration for the programmable IO device to the off-box service; redirecting traffic to the off-box service; updating the firmware installed on the programmable IO device; reprograming a forwarding state provided by the off-box service; disabling the redirection of the traffic to the off-box service; and providing, to the north-bound entity, a notification indicating a completion of the upgrade of the firmware.

Also described herein, in certain embodiments, are systems comprising a north-bound entity; an off-box service; and a programmable IO device. The programmable IO device configured to execute instructions that cause the programmable IO device to perform operations comprising: receiving, from the north-bound entity, a request to upgrade firmware installed on the programmable IO device; disabling flow-miss traffic to the programmable IO device; redirecting the flow-miss traffic to an off-box service; providing a configuration for the programmable IO device to the off-box service; redirecting traffic to the off-box service; updating the firmware installed on the programmable IO device; reprograming a forwarding state provided by the off-box service; disabling the redirection of the traffic to the off-box service; and providing, to the north-bound entity, a notification indicating a completion of the upgrade of the firmware.

Also described herein, in certain embodiments, are a programmable IO devices comprising: at least one CPU core; and a memory unit is provided. The memory unit partitioned into a standby partition and an active partition. The active partition comprises resources used by a forwarding plane to assist with forwarding decisions. The memory unit having instructions stored thereon which, when executed by the programmable IO device, cause the programmable IO device to perform operations comprising: loading a firmware update to the standby partition; receiving, from a north-bound entity, a request to upgrade to the firmware update; programming a forwarding state to the standby partition; disabling incoming configuration updates; quiescing the forwarding plane; reprograming program pointers to reference to the firmware update and a network state stored to the standby partition; un-quiescing the forwarding plane; and enabling incoming configuration updates.

Also described herein, in certain embodiments, are methods for upgrading firmware on a programmable IO device. The method executed by the respective programmable IO device and comprising: loading a firmware update to a standby partition of a memory unit, the memory unit partitioned into the standby partition and an active partition, wherein the active partition comprises resources used by a forwarding plane to assist with forwarding decisions; receiving, from a north-bound entity, a request to upgrade to the firmware update; programming a forwarding state to the standby partition; disabling incoming configuration updates; quiescing the forwarding plane; reprograming program pointers to reference to the firmware update and a network state stored to the standby partition; un-quiescing the forwarding plane; and enabling incoming configuration updates.

Certain Definitions

Unless otherwise defined, all technical terms used herein have the same meaning as commonly understood by one of ordinary skill in the art to which this described system belongs.

As used herein, the singular forms "a," "an," and "the" include plural references unless the context clearly dictates otherwise. Any reference to "or" herein is intended to encompass "and/or" unless otherwise stated.

Reference throughout this specification to "some embodiments," or "an embodiment," means that a particular feature, structure, or characteristic described in connection with the embodiment is included in at least one embodiment. Thus, the appearances of the phrase "in some embodiments," or "in an embodiment," in various places throughout this specification are not necessarily all referring to the same embodiment. Furthermore, the particular features, structures, or characteristics may be combined in any suitable manner in one or more embodiments.

As referenced herein, terms "component," "system," "interface," "unit," "block," "device" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Moreover, the word "exemplary" where used herein to means serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

As used herein, PCIe includes a high-speed serial computer expansion bus standard. In some examples, PCIe is a motherboard interface for hardware components, such as, graphics cards, hard drives, solid-state drives (SSDs), Wi-Fi and Ethernet hardware connections. PCIe is based on point-to-point topology, with separate serial links connecting every device to the root complex (host). PCIe has improvements over the older standards (e.g., Peripheral Component Interconnect (PCI), PCI eXtended (PCI-X) and Accelerated Graphics Port (AGP) bus standards), including higher maximum system bus throughput, lower input output (I/O) pin count and smaller physical footprint, better performance scaling for bus devices, a more detailed error detection and reporting mechanism (e.g., Advanced Error Reporting, (AER)), and native hot-swap functionality. More recent revisions of the PCIe standard provide hardware support for I/O virtualization.

As used herein, an expansion card includes a printed circuit board that can be inserted into an electrical connector, or expansion slot, on a computer motherboard, backplane or riser card to add functionality to a computer system via an expansion bus. In some embodiments, an expansion bus is a computer bus that moves information between the internal hardware of a computer system, such as the CPU and random access memory (RAM), and peripheral devices such as cache, other memory, data storage or electronic display adapters.

As used herein, operations include compression, decompression, encryption, decryption, hash digest computation (dedupe), checksum, and so forth. In some embodiments, these operations also perform "generic" work, such as fetch, decode and execute.

As used herein, a chain of operations includes a combination or a sequence of operations. For example, compress plus encrypt, decrypt plus decompress, checksum plus encrypt plus checksum, and hash plus compress plus pad plus hash.

As used herein, a datapath includes a collection of functional units, such as arithmetic logic units or multipliers, which perform data processing operations, registers, and buses. A larger datapath can be made by joining more than one number of datapaths using multiplexer. In some embodiments, offload chaining within a datapath provides for increased processing throughput. For example, a smartNIC may have a 100 Gigabits per second (Gbps) PCIe data path which, if not properly employed by, for example, a host operating system, would not achieve the full 100 Gbps throughput. The counterpart of a datapath is the control path, which may execute on a host CPU and, as such, would not be able to reach the 100 Gbps throughput.

Embodiments of the described system may be used in a variety of applications. Some embodiments of the described system may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, a wireless communication station, a wireless communication device, a wireless access point (AP), a modem, a network, a wireless network, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or long term evolution (LTE) of the above standards, units and/or devices which are part of the above networks, one way and/or two-way radio communication systems, cellular radio-telephone communication systems, a cellular telephone, a wireless telephone, a personal communication systems (PCS) device, a PDA device which incorporates a wireless communication device, a multiple input multiple output (MIMO) transceiver or device, a single input multiple output (SIMO) transceiver or device, a multiple input single output (MISO) transceiver or device, or the like.

The term "table" refers to a variety types of tables involved in data or packet processing. For example, the table may be match tables used in the match+action stages, such as forwarding tables (e.g., hash tables for Ethernet address lookup, the longest-prefix match tables for IPv4 or IPv6, wildcard lookups for Access Control Lists (ACLs)). These tables may be stored in various memory locations such as in internal SRAM, NIC DRAM, or host memory.

The term "match+action" refers to the paradigm for network packet switching (such as those performed by an OpenFlow switch or P4 pipeline, which uses match tables, action tables, statistics memories, meters memories, stateful memories, and ternary indirection memories). The term "P4" refers to a high-level language for programming protocol-independent packet processors. P4 is a declarative language for expressing how packets are processed by the pipeline of a network forwarding element such as a switch, NIC, router or network function appliance. It is based upon an abstract forwarding model consisting of a parser and a set of match+action table resources, divided between ingress and egress. The parser identifies the headers present in each incoming packet. Each match+action table performs a lookup on a subset of header fields and applies the actions corresponding to the first match within each table.

The term "stateful configuration state" refers to the entries in the memory that correspond to the two-legs of the bi-directional flow and entries that are not updated on a per-packet basis and are instead created with the first flow-miss packet.

While portions of this disclosure, for demonstrative purposes, refer to wired and/or wired communication systems or methods, embodiments of the described system are not limited in this regard. As an example, one or more wired communication systems, can utilize one or more wireless communication components, one or more wireless communication methods or protocols, or the like.

Although some portions of the discussion herein may relate, for demonstrative purposes, to a fast or high-speed interconnect infrastructure, to a fast or high-speed interconnect component or adapter with OS bypass capabilities, to a fast or high-speed interconnect card or NIC with OS bypass capabilities, or to a to a fast or high-speed interconnect infrastructure or fabric, embodiments of the described system are not limited in this regard, and may be used in conjunction with other infrastructures, fabrics, components, adapters, host channel adapters, cards or NICs, which may or may not necessarily be fast or high-speed or with OS bypass capabilities. For example, some embodiments of the described system may be utilized in conjunction with Infini-Band (TB) infrastructures, fabrics, components, adapters, host channel adapters, cards or NICs; with Ethernet infrastructures, fabrics, components, adapters, host channel adapters, cards or NICs; with gigabit Ethernet (GEth) infrastructures, fabrics, components, adapters, host channel adapters, cards or NICs; with infrastructures, fabrics, components, adapters, host channel adapters, cards or NICs that have OS with infrastructures, fabrics, components, adapters, host channel adapters, cards or NICs that allow a user mode application to directly access such hardware and bypassing a call to the operating system (namely, with OS bypass capabilities); with infrastructures, fabrics, components, adapters, host channel adapters, cards or NICs; with infrastructures, fabrics, components, adapters, host channel adapters, cards or NICs that are connectionless and/or stateless; and/or other suitable hardware.

Computer systems employ a wide variety of peripheral components or IO devices. An example of a host processor of a computer system connected to IO devices through a component bus defined by PCIe, a high-speed serial computer expansion bus standard. Device drivers (also referred to drivers) are hardware-specific software which controls the operation of hardware devices connected to computing systems.

In computing, virtualization techniques are used to allow multiple operating systems to simultaneously share processor resources. One such virtualization technique is Single Root I/O Virtualization (SR-IOV), which is described in the PCI-SIG Single Root I/O Virtualization and Sharing Specifications. A physical IO device may allow multiple virtual machines to use the device concurrently through SR-IOV. In SR-IOV, a physical device may have physical functions (PFs) that allow for input/output operations and device configuration, as well as one or more virtual functions (VFs) that allow for data input/output. According to SR-IOV, a Peripheral Component Interconnect Express (PCIe) device can appear to be multiple separate physical PCIe devices. For example, a SR-IOV NIC having a single port can have up to 256 virtual functions, with each virtual function representing a respective NIC port.

In one aspect, a programmable device interface is provided. The device interface may be a highly optimized ring based I/O queue interface with an efficient software programming model to deliver high performance with CPU and PCIe bus efficiency. FIG. 1 shows a block diagram of an exemplary computing system architecture 100, in accordance with embodiments of the described system. A hypervisor 121 on the host computing system 120 may interact with the physical IO device 110 using the PFs 115 and one or more VFs 113. As illustrated, the computing system 120 may comprise a management device 117 configured for management of the interface devices. The management device 117 may be in communication with a processing entity 111 (e.g., ARM processor) and a management entity 119 (e.g., management virtual machine system). It should be noted that the illustrated computing system is only an example mechanism, without suggesting any limitation as to the scope of the described system. The provided programmable IO interface and methods can be applied to any operating-system-level virtualization (e.g., container and docker system) or machine level virtualization or computing system without virtualization features.

The hypervisor 121 generally provides operating system functionality (e.g., process creation and control, file system process threads, etc.) as well as CPU scheduling and memory management for the host. In some cases, the host computing system 120 may include programs that implement a machine emulator and virtualizer. The machine emulator and virtualizer may assist in virtualizing respective computer IO devices in virtual machines, such as virtualized hard disks, compact disk drives, and NICs. Virtio is a virtualization standard for implementing virtual IO devices in a virtual machine and may be considered as an abstraction for a set of common emulated devices in a hypervisor.

The provided programmable IO device interface mechanism allows for native hardware speeds when using the device emulator. The programmable IO device interface allows the host system to interface with the IO device with existing device drivers without reconfiguration or modification. In some cases, the VF device, PF device and management device may have similar driver interface such that such devices can be supported by a single driver. Such devices may, in some cases, be referred to as Ethernet devices.

The IO device 110 may provide a variety of services and/or functionality to an operating system operating as a host on computing system 120. For example, the IO device may provide network connectivity functions to the computing system, coprocessor functionality (e.g., graphics processing, encryption/decryption, database processing, etc.) and the like. The IO device 110 may interface with other components in the computing system 100 via, for example, a PCIe bus.

As mentioned above, SR-IOV specification enables a single root function (for example, a single Ethernet port) to appear to virtual machines as multiple physical devices. A physical IO device with SR-IOV capabilities may be configured to appear in the PCI configuration space as multiple functions. The SR-IOV specification supports physical functions and virtual functions.

Physical functions are full PCIe devices that may be discovered, managed, and configured as normal PCI devices. Physical functions configured and manage the SR-IOV functionality by assigning virtual functions. The IO device may expose one or more physical functions (PFs) 115 to a host computing system 120 or hypervisor 121. The PFs 115 may be full-featured PCIe devices that include all configuration resources and capabilities for the IO device. In some cases, the PFs may be PCIe functions that include SR-IOV extended capability, which facilitates the configuration or management of the IO device. The PF device is essentially a base controller of the Ethernet device. The PF device may be configured with up to 256 VFs. In some cases, the PFs may include extended operations such as allocating, configuring and freeing a VF, discovering hardware capabilities of the VF, such as Receive Side Scaling (RSS), discovering hardware resources of the VF, such as number of queues and interrupts resources, configuring the hardware resources and features of a VF, saving and restoring hardware state and the like. In some instances, the PF device may be configured as a boot device which may present an Option ROM base address registers (BAR).

The IO device may also provide one or more virtual functions (VFs) 113. The VFs may be lightweight PCIe functions that contain the resources necessary for data movement but may have a minimized set of configuration resources. In some cases, the VFs may include lightweight PCIe functions that support SR-IOV. To use SR-IOV devices in a virtualized system, the hardware may be configured to create multiple VFs. These VFs may be made available to the hypervisor for allocations to virtual machines. The VFs may be manipulated (e.g., created, configured, monitored, or destroyed) for example, by the SR-IOV physical function device. In some cases, each of the multiple VFs is configured with one or more base address registers (BARs) to map NIC resources to the host system. A VF may map one or more LIFs or port, which are used in the IO device for forwarding and transaction identification. A LIF may belong to only one VF. Within a physical device, all virtual functions may have an identical BAR resource layout, stacked sequentially in host PCIe address space. The IO device PCIe interface logic may be programmed to map control registers and NIC memory regions with programmable access permissions (e.g., read, write, execute) to the VF BARs.

The IO device 110 may comprise a management device 117 for management of the IO device. The management device 117 may not have direct access to the network uplink ports. The management device may be in communication with the processing entity 111. For example, the traffic on the management device may be steered to internal receive queues for processing by the management software on the processing entity 111. In some cases, the management device may be made available to pass through the hypervisor to a management entity 119 such as a management virtual machine. For example, the management device 117 may be assigned a device ID different from the PF device 115, such that a device driver in the hypervisor may be released for the PF device when the PF device does not claim the management device.

Figure 2:
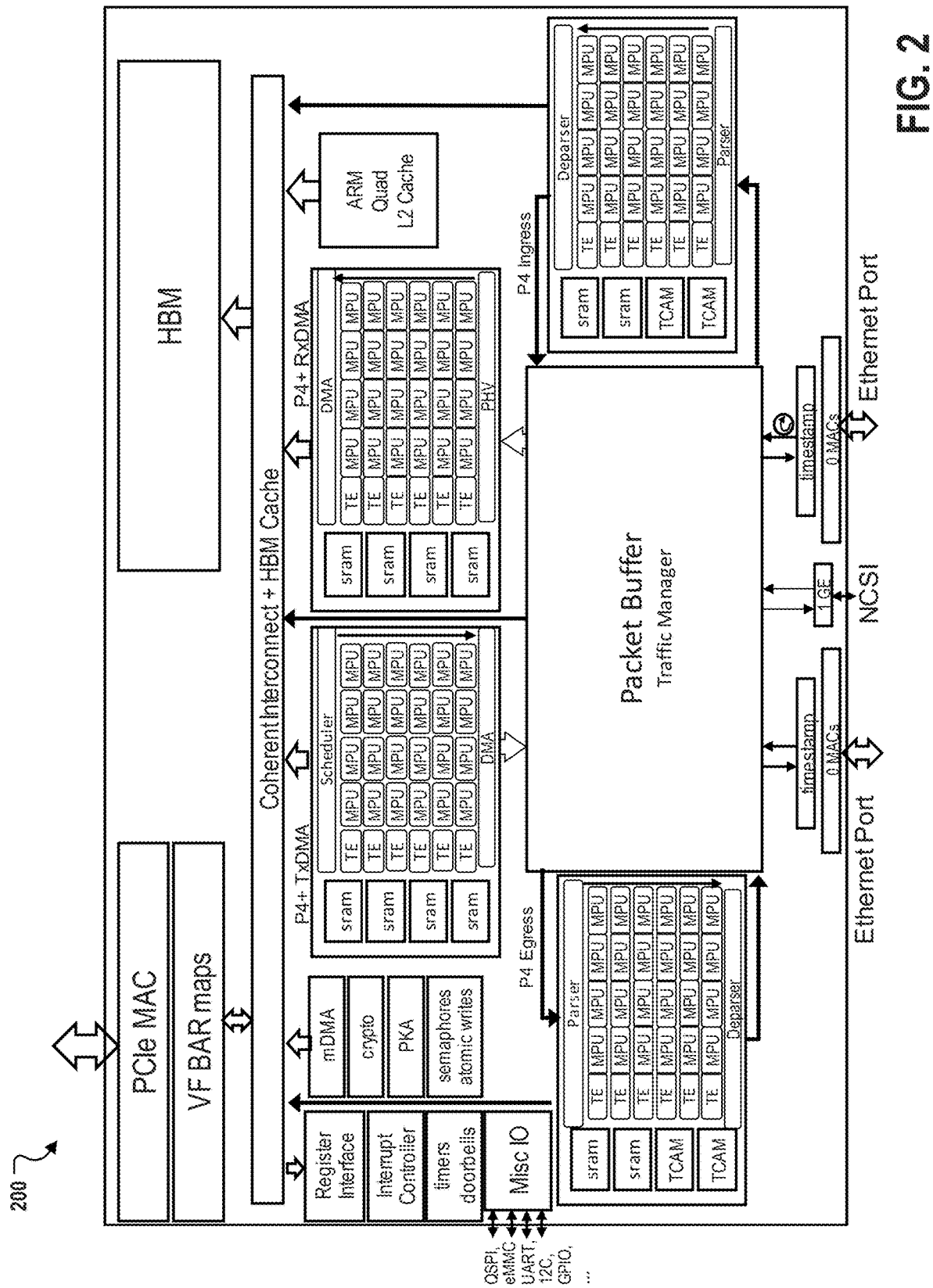
FIG. 2 depicts a non-limiting example of configurations of multiples MPUs for executing a program that may be employed by embodiments of the present disclosure.

FIG. 2 shows another exemplary IO device system 200 with described programmable device interface, in accordance with some embodiments of the described system. The system 200 serves as an example of implementing the P4 and extended P4 pipelines and various other functions to provide an improved network performance. In some cases, the device interface may have improved network performance by: not requiring PCIe bus register reads in the packet transmit or receive path; providing a single posted (non-blocking) PCIe bus register write for packet transmit; supporting for message signaled interrupts (MSI) and message signaled interrupts-extended (MSI-X) modes with driver-configurable interrupt moderation for high-performance interrupt processing; supporting I/O queues with outstanding requests (e.g., up to 64 k) per queue; transmitting TCP segmentation Offload (TSO) with improved send size; providing Transmission Control Protocol (TCP)/User Datagram Protocol (UDP) checksum offload; supporting for a variable number of Receive Queues to support industry standard Receive Side Scaling (RSS); supporting SR-IOV with up to 255 virtual functions.

The IO device system 200 may be the same IO device as described in FIG. 1 and implemented as a rack mounted device and comprise one or more Application Specific Integrated Circuits (ASICs) and/or boards with components mounted thereon. As shown in FIG. 2, the system 200 may comprise four ARM processors with coherent L1 and L2 caches, a shared local memory system, flash non-volatile memory, DMA engines, and miscellaneous IO devices for operation and debug. The ARM processors may observe and control all NIC resources via an address map. The ARM processor may implement the P4 pipeline and the extended P4 pipeline as described later herein.

The system may comprise a host interface and a network interface. The host interface may be configured to provide communication link(s) with one or more hosts (e.g., host servers). The host interface block may also observe regions of the address space via PCIe BAR maps to expose NIC functions to a host system. In an example, the address map may be initially created according to the principles of ARM memory maps, ARM limited, which provides SOC addressing guidelines for a 34-bit memory map.

The network interface may support network connections or uplinks with a computing network that may be, for example, a local area network, wide area network and various others as described elsewhere herein. The physical link may be controlled by a management agent (e.g., management entity 119) through the device driver. For example, the physical link may be configured via a "virtual link" associated with a device LIF.

Memory transactions in the system 200, including host memory, HBM, and registers may be connected via a coherent network on a chip (NOC) based on IP from an external Systems. The NOC may provide cache coherent interconnect between the NOC masters, including P4 pipeline, extended P4 pipeline, DMA, PCIe, and ARM. The interconnect may distribute HBM memory transactions across a plurality (e.g., 16) of HBM interfaces using a programmable hash algorithm. All traffic targeting HBM may be stored in the NOC cache (e.g., 1 MB cache). The NOC cache may be kept coherent with the ARM caches. The NOC cache may be used to aggregate HBM write transactions which may be smaller than the cache line (e.g., size of 64 bytes), as the HBM is not efficient when processing small writes. The NOC cache may have high bandwidth, supporting up to 3.2 Tb/s operation as it fronts the 1.6 Tb/s HBM.

The system may comprise an internal HBM memory system for running Linux, storing large data structures such as flow tables and other analytics, and providing buffering resources for advanced features including TCP termination and proxy, deep packet inspection, storage offloads, and connected FPGA functions. The memory system may comprise a HBM module which may support 4 GB capacity or 8 GB capacity, depending on package and HBM.

As mentioned above, the system may comprise a PCIe host interface. The PCIe host interface may support a bandwidth of, for example, 100 Gb/s per PCIe connection (e.g., dual PCIe Gen4×8 or single PCIe Gen3×16). A mechanism or a scheme to map resources available at the IO device to memory-mapped control regions associated with the virtual IO devices may be implemented by using a pool of configurable PCIe Base Address Registers (BARs) coupled with a resource mapping table to store mapping information for each virtual IO device. The IO resources provided by the IO device may be mapped to host addresses in the framework of the PCIe standard such that the same device drivers that are utilized to communicate with physical PCIe devices may be utilized to communicate with corresponding virtual PCIe devices.

The IO device interface may comprise programmable registers. These registers may comprise, for example, PCIe base address registers (BARs) that may include a first memory BAR containing device resources (e.g., device command registers, doorbell registers, interrupt control registers, interrupt status registers, MSI-X interrupt table, MSI-X interrupt pending bit array, etc.) a second BAR containing device doorbells pages, and a third BAR for mapping a controller memory buffer.

The device command registers are a set of registers used for submitting administrative commands to the hardware or firmware. For example, the device command registers may specify a single-64 byte command and a single 16-byte completion response. This register interface may allow for a single command outstanding at a time. The device command doorbell is a special purpose doorbell used to signal a command is ready in the device command registers.

The second BAR may contain doorbells pages. The general form of the second BAR may contain multiple LIFs with multiple doorbell pages per LIF. A network device (i.e., IO device) may have at least one LIF with at least one doorbell page. Any combination of single/many LIFs with single/many Doorbell Pages is possible and the driver may be prepared to identify and operate the different combinations. In an example, doorbell pages may be presented on a 4*k* stride by default to match a common system page size. The stride between doorbell pages may be adjusted in the virtual function device 113 to match the system page size configuration setting in the SR-IOV capability header in the parent physical function device 115. This page size separation allows protected independent direct access to a set of doorbell registers by processes by allowing each process to map and access a doorbell page dedicated for its use. Each page may provide the doorbell resources needed to operate the data path queue resources for a LIF, while protecting access to those resources from another process.

The doorbell register may be written by software to adjust a queue's producer index. Adjusting the producer index is the mechanism to transfer ownership of queue entries in the queue descriptor ring to the hardware. Some doorbell types, such as the Admin Queue, Ethernet Transmit Queue, and RDMA Send Queue, may cause the hardware queue to schedule further processing of the descriptors available in the queue. Other queue types, such as Completion Queues and Receive Queues, may require no further action from the hardware queue after updating the producer index.

The interrupt status register may contain a bit for each interrupt resource of the device. The register may have a bit set indicating the corresponding interrupt resource has asserted its interrupt. For example, bit 0 in Interrupt Status indicates interrupt resource 0 is asserted, bit 1 indicates interrupt resource 1 is asserted.

The controller memory buffer may be a region of general-purpose memory resident on the IO device. The user or kernel driver may map in this controller memory BAR, and build descriptor rings, descriptors, and/or payload data in the region. A bit may be added in the descriptor to select whether the descriptor address field is interpreted as a host memory address, or as an offset relative to the beginning of the device controller memory window. The extended P4 program may set a designated bit (e.g., bit 63) of the address if it is a host address or clear the bit and add the device controller memory base address to the offset when building the TxDMA operations for the DMA stage.

The MSI-X resources may be mapped through the first BAR and the format may be described by the PCIe Base Specification. The MSI-X interrupt table is a region of control registers that allows an OS to program MSI-X interrupt vectors on behalf of the driver.

The MSI-X Interrupt Pending Bit Array (PBA) is an array of bits, one for each MSI-X interrupt supported by the device.

The IO device interface may support programmable DMA register tables, descriptor formats, and control register formats, allowing specialized VF interfaces and user defined behaviors. The IO device PCIe interface logic may be programmed to map control registers and NIC memory regions with programmable access permissions (e.g., read, write, execute) to the VF BARs.

Match Processing Unit

In an aspect of the described system, an MPU is provided to process a data structure. The data structure may comprise various types such as data packet, a management token, administrative command from a host, a processing token, a descriptor ring and various others. The MPU may be configured to perform various operations according to the type of data being processed or different purposes. For example, the operations may include table-based actions for processing packets, table maintenance operations such as writing a timestamp to a table or harvesting table data for export, administrative operations such as creating new queues or memory maps, gathering statistics, and various other operations such as initiating a bulk data processing that may result in writing any type of modified data to the host memory.

In some embodiments, the MPU may process a data structure in order to update the memory based data structure or initiate an event. The event may or may not relate to modifying or updating a packet. For instance, the event may be administrative operations such as creating new queues or memory maps, gathering statistics, initiating a bulk data processing that may result in writing any type of modified data to the host memory, or performing calculations on descriptor rings, scatter gather lists (SGLs).

Figure 3:
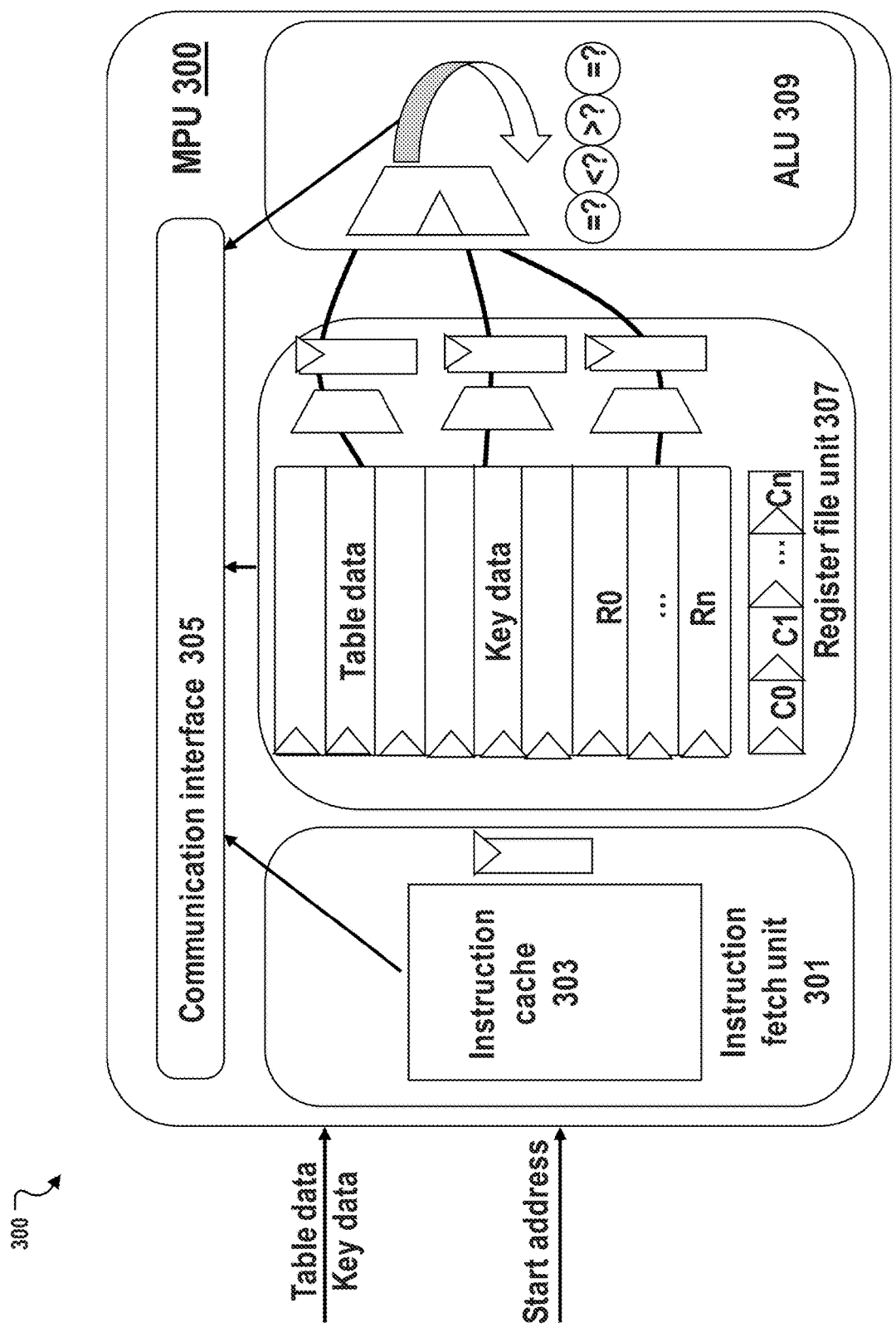
FIG. 3 depicts a non-limiting example of an MPU that may be employed by embodiments of the present disclosure.

FIG. 3 shows a block diagram of a MPU 300, in accordance with embodiments of the described system. In some embodiments, the MPU unit 300 may comprise multiple functional units, memories and at least a register file. For example, the MPU unit may comprise an instruction fetch unit 301, a register file unit 307, a communication interface 305, arithmetic logic units (ALUs) 309 and various other functional units.

In the illustrated example, the MPU unit 300 may comprise a write port or communication interface 305 allowing for memory read/write operations. For instance, the communication interface may support packets written to or read from an external memory (e.g., HBM of a host device) or an internal SRAM. The communication interface 305 may employ any suitable protocol such as Advanced Microcontroller Bus Architecture (AMBA) Advanced extensible Interface (AXI) protocol. AXI is a bus protocol for a high-speed/high-end on-chip bus protocol and has channels associated with read, write, address, and write response, which are respectively separated, individually operated, and have transaction properties such as multiple-outstanding address or write data interleaving. The AXI interface 305 may include features that support for unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long they do not write to the same byte. In some cases, dirty bytes in the table need not be contiguous and the MPU may only write back a table if at least one bit in the dirty vector is set. Though packet data is transferred according the AXI protocol in the packet data communication on-chip interconnect system according to the present exemplary embodiment in the present specification, it can also be applied to a packet data communication on-chip interconnect system operating by other protocols supporting a lock operation, such as Advanced High-performance Bus (AHB) protocol or Advanced Peripheral Bus (APB) protocol in addition to the AXI protocol.

The MPU 300 may comprise an instruction fetch unit 301 configured to fetch instruction set from a memory external to the MPU based on the input table result or at least a portion of the table result. The instruction fetch unit may support branches and/or linear code paths based on table results or a portion of a table result provided by a table engine. In some cases, the table result may comprise table data, key data and/or a start address of a set of instructions/program. Details about the table engine are described later herein. In some embodiments, the instruction fetch unit 301 may comprise an instruction cache 303 for storing one or more programs. In some cases, the one or more programs may be loaded into the instruction cache 303 upon receiving the start address of the program provided by the table engine. In some cases, a set of instructions or a program may be stored in a contiguous region of a memory unit, and the contiguous region can be identified by the address. In some cases, the one or more programs may be fetched and loaded from an external memory via the communication interface 305. This provides flexibility to allow for executing different programs associated with different types of data using the same processing unit. In an example, when a management packet header vector (PHV) injected into the pipeline, for example to perform administrative table direct memory access (DMA) operations or entry aging functions (i.e., adding timestamps), one of the management MPU programs may be loaded to the instruction cache to execute the management function. The instruction cache 303 can be implemented using various types of memories such as one or more SRAMs.

The one or more programs can be any programs such as P4 programs related to reading table, building headers, DMA to/from memory regions in HBM or in the host device and various other actions. The one or more programs can be executed in any stage of a pipeline as described elsewhere herein.

The MPU 300 may comprise a register file unit 307 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 307 may comprise a plurality of general-purpose registers (e.g., R0, R1, . . . Rn) which may be initially loaded with metadata values then later used to store temporary variables within execution of a program until completion of the program. For example, the register file unit 307 may be used to store SRAM addresses, TCAM search values, ALU operands, comparison sources, or action results. The register file unit of a stage may also provide data/program context to the register file of the subsequent stage, as well as making data/program context available to the next stage's execution data path (i.e., the source registers of the next stage's adder, shifter, and the like). In one embodiment, each register of the register file is 64 bits and may be initially loaded with special metadata values such as hash value from table, lookup, packet size, PHV timestamp, programmable table constant and the like, respectively.

In some embodiments, the register file unit 307 may also comprise comparator flags unit (e.g., C0, C1, . . . Cn) configured to store comparator flags. The comparator flags can be set by calculation results generated by the ALU which in return is compared with constant values in an encoded instruction to determine a conditional branch instruction. In an embodiment, the MPU may comprise eight one-bit comparator flags. However, it should be noted that MPU may comprise any number of comparator flag units each of which may have any suitable length.

The MPU 300 may comprise one or more functional units such as the ALU 309. The ALU may support arithmetic and logical operations on the values stored in the register file unit 307. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g., table flush), or perform operations that are not related to PHV update. For example, the ALU may be configured to perform calculations on descriptor rings, scatter gather lists (SGLs), and control data structures loaded into the general purpose registers from the host memory.

The MPU 300 may comprise various other functional units such as meters, counters, action insert unit and the like. For example, the ALU may be configured to support P4 compliant meters. A meter is a type of action executable on a table match used to measure data flow rates. A meter may include a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be remarked as a result of overflowing the base band. This information might be used later to direct the packet to a different queue, where it may be more subject to delay or dropping in case of congestion. The counter may be implemented by the MPU instructions. The MPU may comprise one or more types of counters for different purposes. For example, the MPU may comprise performance counters to count MPU stalls. The action insert unit may be configured to push the register file result back to the PHV for header field modifications.

The MPU may be capable of locking a table. In some case, a table being processed by a MPU may be locked or marked as "locked" in the table engine. For example, while an MPU has a table loaded into its register file, the table address may be reported back to the table engine, causing future reads to the same table address to stall until the MPU has released the table lock. For instance, the MPU may release the lock when an explicit table flush instruction is executed, the MPU program ends, or the MPU address is changed. In some cases, an MPU may lock more than one table addresses, for example, one for the previous table write-back and another address lock for the current MPU program.

MPU Pipelining

A single MPU may be configured to execute instructions of a program until completion of the program. Alternatively, or additionally, multiple MPUs may be configured to execute a program. In some embodiments, a table result may be distributed to multiple MPUs. The table result may be distributed to multiple MPUs according to a MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Any number of MPUs may be used for executing a program in order to meet a desirable performance. For instance, at least two, three, four, five, six, seven, eight, nine, or ten MPUs may be used to execute a program. Each MPU may execute at least a portion of the program or a subset of the instruction set. The multiple MPUs may perform the execution simultaneously or sequentially. Each MPU may or may not perform the same number of instructions. The configurations may be determined according to the length of program (i.e., number of instructions, cycles) and/or number of available MPUs. In some case, the configuration may be determined by an application instruction received from a main memory of a host device operably coupled to the plurality of MPUs.

P4 Pipelines

Figure 4:
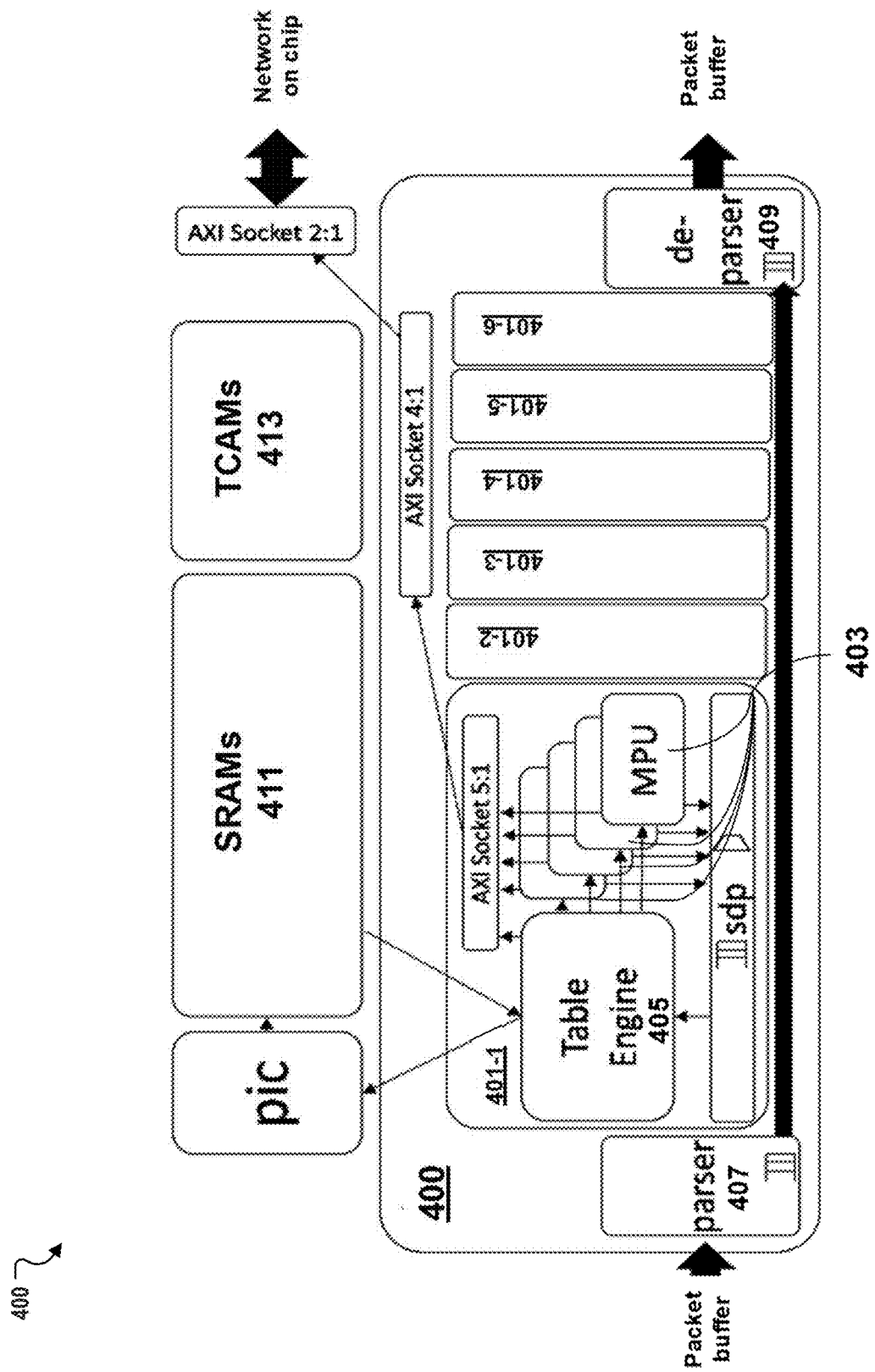
FIG. 4 depicts a non-limiting example of P4 ingress or egress pipeline (PIP pipeline) that may be employed by embodiments of the present disclosure.

In one aspect, a flexible, high performance match action pipeline which can execute a wide range of P4 programs is provided. The P4 pipeline can be programmed to provide various features, including, but not limited to, routing, bridging, tunneling, forwarding, network ACLs, L4 firewalls, flow based rate limiting, VLAN tag policies, membership, isolation, multicast and group control, label push/pop operations, L4 load balancing, L4 flow tables for analytics and flow specific processing, DDOS attack detection, mitigation, telemetry data gathering on any packet field or flow state and various others. FIG. 4 shows a block diagram of an exemplary P4 ingress or egress pipeline (PIP pipeline) 400 in accordance with embodiments of the described system.

In some embodiments, the described system may support a match+action pipeline. The programmer or compiler may decompose the packet processing program into a set of dependent or independent table lookup and action processing stages (i.e., match+action) which are mapped onto the table engine and MPU stages respectively. The match+action pipeline may comprise a plurality of stages. For example, a packet entering the pipeline may be first parsed by a parser (e.g., parser 507) according to the packet header stack specified by a P4 program. This parsed representation of the packet may be referred to as parsed header vector. The parsed header vector may then be passed through stages (e.g., stages 401-1, 401-2, 401-3, 401-4, 401-5, 401-6) of ingress match+action pipeline, wherein each stage is configured to match one or more parsed header vector fields to tables, then updates the packet header vector (PHV) and/or table entries according to the actions specified by the P4 program. In some instances, if the required number of stages exceeds the implemented number of stages, a packet may be recirculated for additional processing. In some cases, the packet payload may travel in a separate first-in-first-out (FIFO) queue until it is reassembled with its PHV in the de-parser (e.g., de-parser 409). The de-parser may rewrite the original packet according to the PHV fields which have been modified (e.g., added, removed, or updated). In some cases, the packet processed by the ingress pipeline may be placed in a packet buffer for scheduling and possible replication. In some cases, once the packet is scheduled and leaves the packet buffer, it may be parsed again to create an egress parsed header vector. The egress parsed header vector may be passed through a sequence of stages of match+action pipeline in a similar fashion of the ingress match+action pipeline, after which a final de-parser operation may be executed before the packet is sent to its destination interface or recirculated for additional processing.

In some embodiments, the ingress pipeline and egress pipeline may be implemented using the same physical block or processing unit pipeline. In some embodiments, the PIP pipeline 400 may comprise at least one parser 407 and at least one de-parser 409. The PIP pipeline 400 may comprise multiple parsers and/or multiple de-parsers. The parser and/or de-parser may be a P4 compliant programmable parser or de-parser. In some cases, the parser may be configured to extract packet header fields according to P4 header definitions and place them in the packet header vector (PHV). The parser may select from any fields within the packet and align the information from the selected fields to create a packet header vector. In some cases, after passing through a pipeline of match+action stages, the de-parser block may be configured to rewrite the original packet according to the updated PHV.

The packet header vector (PHV) produced by the parser may have any size or length. For example, the PHV may be a least 512 bits, 256 bits, 128 bits, 64 bits, 32 bits, 8 bits or 4 bits. In some cases, when a long PHV (e.g., 6 Kb) is desired to contain all relevant header fields and metadata, a single PHV may be time division multiplexed (TDM) across several cycles. This TDM capability provides benefit allowing the described system to support variable length PHVs, including very long PHVs to enable complex features. A PHV length may vary as the packet passes through the match+action stages.

The PIP pipeline may comprise a plurality of match+action stages. After the parser 407 produces the PHV, the PHV may be passed through the ingress match+action stages. In some embodiments, the PIP pipeline may be implemented using multiple stage units 401-1, 401-2, 401-3, 401-4, 401-5, 401-6, each of which may comprise a table engine 405 and multiple MPUs 403. The MPU 403 can be same as the MPU as described in FIG. 4. In the illustrated example, four MPUs are used in one stage unit. However, any other number of MPUs, such as at least one, two, three, four, five, six, seven, eight, nine, or ten can be utilized or grouped with a table engine.

A table engine 405 may be configured to support per-stage table match. For example, the table engine 405 may be configured to hash, lookup, and/or compare keys to table entries. The table engine 405 may be configured to control table match process by controlling the address and size of the table, PHV fields to use as a lookup key, and MPU instruction vector which defines the P4 program associated with the table. A table result produced by the table engine may be distributed to the multiple MPUs 403.

The table engine 405 may be configured to control a table selection. In some cases, upon entering a stage, the PHV may be examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on packet type or protocols (e.g., Internet Protocol version 4 (IPv4), Internet Protocol version 6 (IPv6) and Multiprotocol Label Switching (MPLS)) or the next table ID as determined by the preceding stage. In some cases, the incoming PHV may be analyzed by the table selection logic, which then generates a table selection key and compares the result using a TCAM to select the active tables. The table selection key may be used to drive table hash generation, table data comparison, and associated data into the MPUs.

In some embodiments, the table engine 405 may comprise a hash generation unit. The hash generation unit may be configured to generate a hash result off a PHV input and the hash result may be used to conduct a DMA read from a DRAM or SRAM array. In an example, the input to the hash generation unit may be masked according to which bits in the table selection key contribute to the hash entropy. In some cases, the same mask may be used by the table engine for comparison with the returning SRAM read data. In some instances, the hash result may be scaled according to the table size, then the table base offset may be added to create the memory index. The memory index may be sent to the DRAM or SRAM array and to perform the read.

In some cases, the table engine 405 may comprise a TCAM control unit. The TCAM control unit may be configured to allocate memory to store multiple TCAM search tables. In an example, a PHV table selection key may be directed to a TCAM search stage before a SRAM lookup. TCAM search tables can be configured to be up to 1024 bits wide and as deep as TCAM resources permit. In some cases, multiple TCAM tables may be carved from the shared quadrant TCAM resources. The TCAM control unit may be configured to allocate TCAMs to individual stages so that to prevent TCAM resource conflicts or allocate TCAM into multiple search tables within a stage. The TCAM search index results may be forwarded to the table engine for SRAM lookups.

The PIP pipeline 400 may comprise multiple stage units 401-1, 401-2, 401-3, 401-4, 401-5, 401-6. The PIP pipeline may comprise any number of stage units such as at least two, three, four, five, six, seven, eight, nine, ten sage units that can be used within the PIP pipeline. In the illustrated example, six match+action stages units 401-1, 401-2, 401-3, 401-4, 401-5, 401-6 are grouped into a set. The set of stages units may share a common set of SRAMs 411 and TCAMs 413. The SRAMs 411 and TCAMs 413 may be component of the PIP pipeline. This arrangement may allow the six stage units to divide match table resources in any suitable proportion which provides convenience to the compiler and easing the complier's task of resource mapping. Any suitable number of SRAM resources and any suitable number of TCAM resources may be used by each PIP pipeline. For example, the illustrated PIP pipeline may be coupled to ten SRAM resources and four or eight TCAM resources. In some instances, TCAMs may be fused vertically or horizontally for a wider or deeper search.

Extended P4 Pipelines

In one aspect, the described system may support an extended P4 programmable pipeline to allow for direct interfacing with the host driver. The extended P4 programmable pipeline implements the IO device interface as described above. For example, the P4 programmed DMA interfaces may be directly coupled to the host virtual functions (VFs) as well as ARM, CPU, or offload engine interfaces. The extended P4 pipeline may handle required DMA operations and loops. The extended P4 pipeline may include features, including but not limited to, stateless NIC offloads such as TCP segmentation offload (TSO) and Receive Side Scaling (RSS); storage exchange table-style transaction servicing in the extended P4 pipeline; fine grained load balancing decisions that can be extended to individual data structures of performance critical applications, such as DPDK or key value matching; TCP flow termination and initiation for proxy services; RDMA over converged Ethernet (RoCE) and similar remote direct memory access (RDMA) protocol support; custom descriptor and SGL formats can be specified in P4 to match data structures of performance critical applications; new device and VF behaviors can be modelled using P4 programs coupled with host driver development, and various other features.

Data may be transmitted between the packetized domain in the P4 pipeline to/from the memory transaction domain in the host and NIC memory systems. This packet to memory transaction conversion may be performed by the extended P4 pipelines that include DMA write (TxDMA) and/or DMA read (RxDMA) operations. The extended P4 pipeline includes TxDMA may also be referred to as Tx P4 or TxDMA and the extended P4 pipeline includes RxDMA may also be referred to as Rx P4 throughout this specification. The extended P4 pipelines may comprise the same match+action stages in the P4 pipeline, and a payload DMA stage at the end of the pipeline. Packets may be segmented or reassembled into data buffers or memory regions (e.g., RDMA registered memory) according to the extended P4 programs. The payload DMA stage may be a P4 extension which enables the programmable P4 network pipeline extended to the host memory system and driver interface. This P4 extension allows custom data structures and applications interactions to be tailored to application or container needs.

The match table utilized in the extended P4 pipeline may be programmable tables. A stage of an extended P4 pipeline may include multiple programmable tables which may exist in SRAM, NIC DRAM, or host memory. For example, host memory structures may include descriptor rings, SGLs, and control data structures which can be read into the register file unit of the MPU for calculations. The MPU may add PHV commands to control DMA operations to and from host and NIC memory and insert DMA commands into the PHV for execution by the payload DMA stage. The extended P4 programs may include, for example, completion queue events, interrupts, timer set, and control register writes and various other programs.

Zero-Packet-Loss Upgrade System

Figure 5:
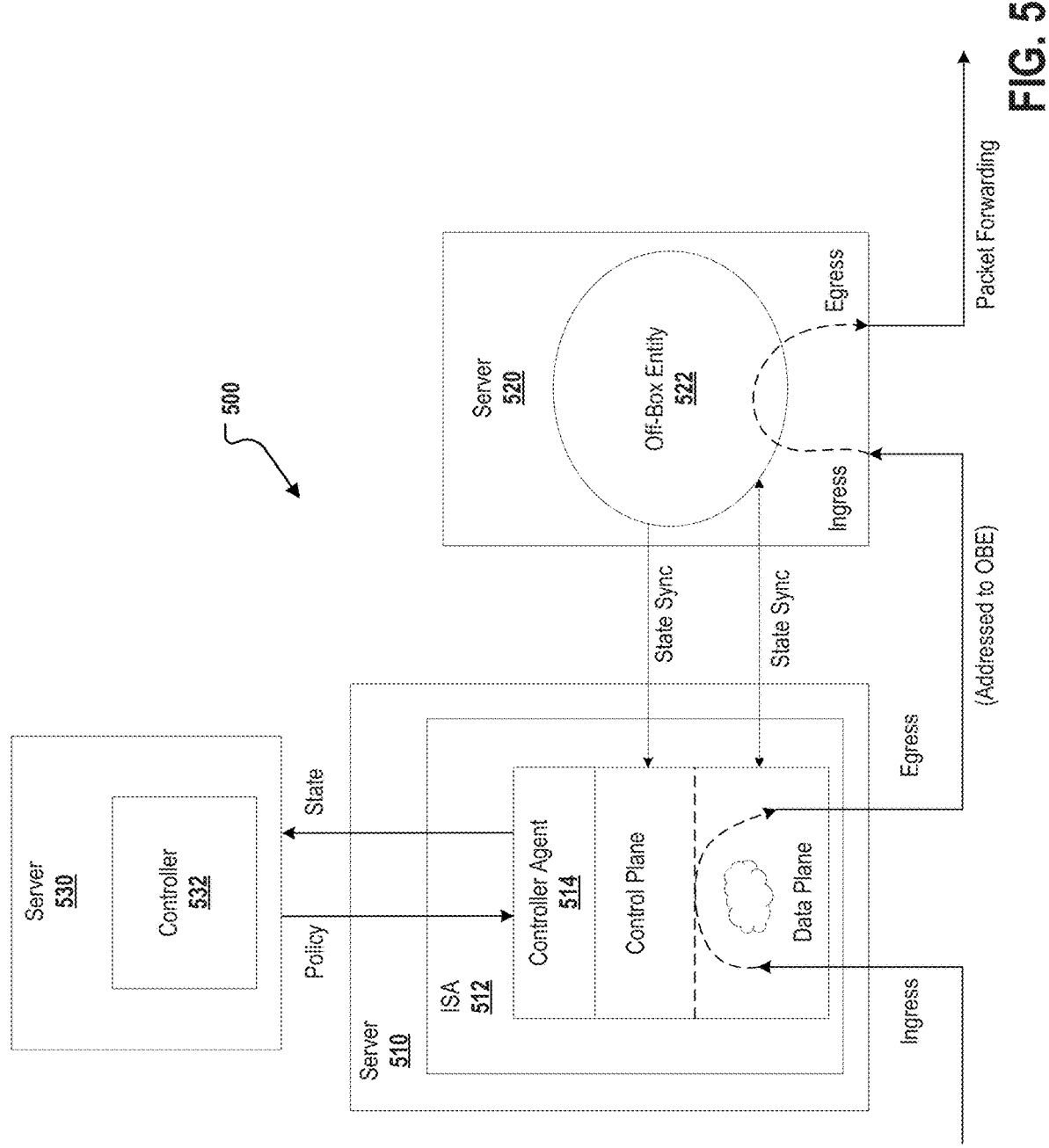
FIG. 5 depicts an example architecture that can be employed to implement the described zero-packet-loss upgrade system to provide for an upgrade window on an ISA.
Figure 6A:
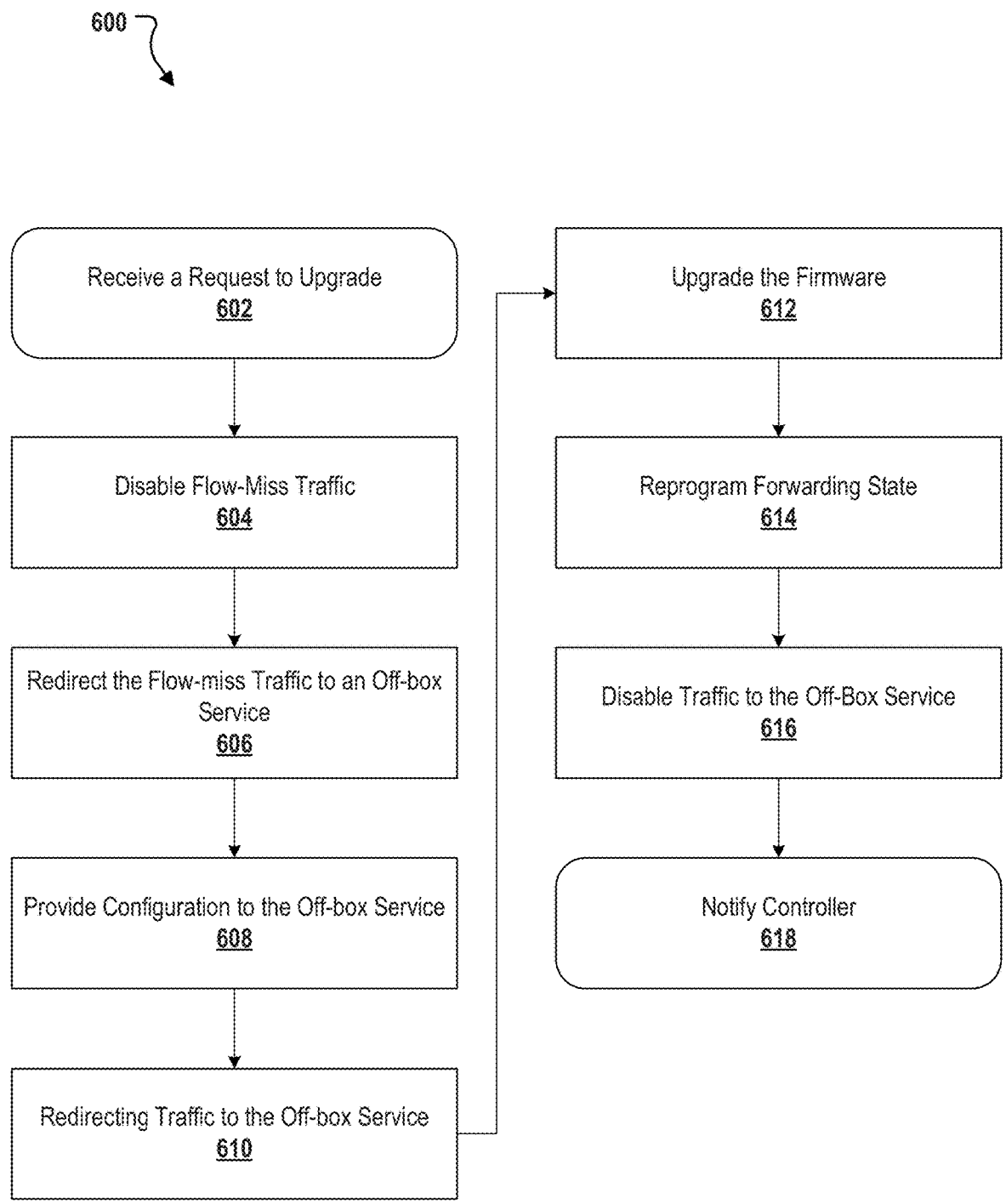
FIG. 6A depicts a flowchart of a non-limiting example process that can be implemented by embodiments of the present disclosure.
Figure 6B:
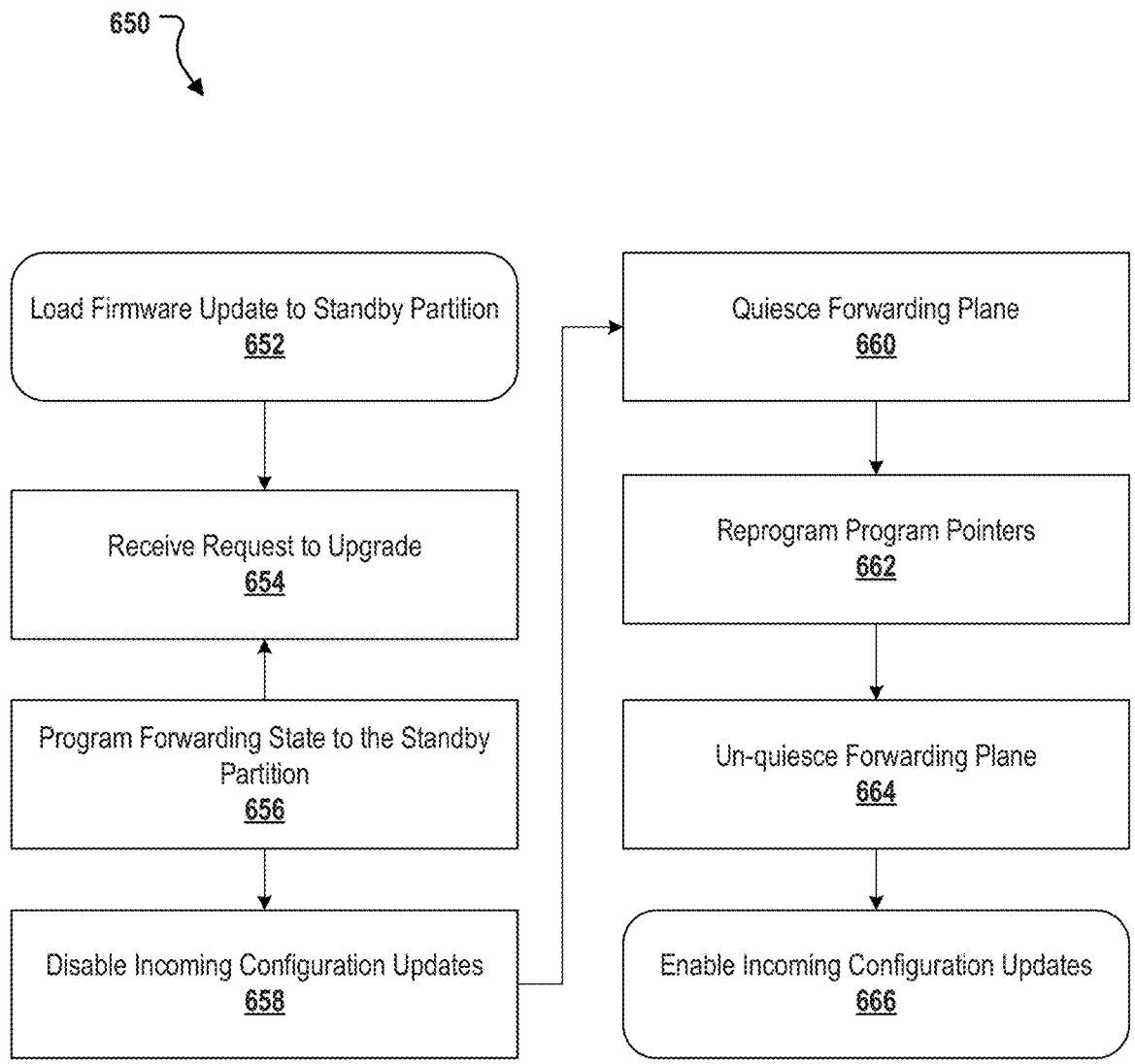
FIG. 6B depicts another flowchart of a non-limiting example process that can be implemented by embodiments of the present disclosure.

FIG. 5 depicts an example architecture 500 that can be employed to implement the described zero-packet-loss upgrade system to provide for an upgrade window on an ISA (See FIGS. 6A and 6B). The example architecture 500 includes three server devices 510, 520, and 530. The server device 510 includes an installed ISA 512, the server device 520 includes the off-box entity application 522, and the server device 530 includes the controller 532. The three server devices are depicted in FIG. 5 for simplicity. It is contemplated, however, that implementations of the present disclosure can be realized with any of the appropriate computing devices. Moreover, implementations of the present disclosure can employ any number of devices as required. For example, the controller 532 and the off-box entity application 522 may each be executed on separate servers (as depicted in FIG. 5) or both applications may be executed on a single server or server cluster. In some embodiments, the off-box entity application 522 is executed on a different than the server that includes the ISA 512. In some embodiments, the controller 532 is executed on the server that includes the ISA 512. In some embodiments, the controller 532 is on a different than the server that includes the ISA 512 (as depicted in FIG. 5). In some embodiments, the off-box entity application 522 and the controller 532 are executed through cloud-based resources.

In some embodiments, the controller 532 is an application executed on a dedicated server or on a shared server in the cloud. In some embodiments, the controller 532 orchestrates applying and managing a desired state of a network/cluster. In some embodiments, the described system includes northbound APIs to expose stateful and stateless configuration state of the ISA and to help with reading the state pre-upgrade and writing it back post-upgrade.

As depicted, the server 510 includes an installed ISA 512 communicably coupled to at least on CPU of the server 510. In some embodiments, the ISA 512 is configured to provide ingress and egress access to the data plane and the control plane for the server 510. In some embodiments, during a firmware/code upgrade of the ISA 512, the data plane provided through the ISA 512 is configured to redirect traffic to the off-box service during an upgrade window and forwards the traffic once returned by the off-box service.

As depicted, the ISA 512 includes a controller agent 514. In some embodiments, the controller agent 514 is a process running on the ISA 514 that fetches instructions from the controller 532 and provides instructions received from the controller 532 to the appropriate end-point(s) on the ISA 512. In some embodiments, the controller agent 514 is also responsible for orchestrating special tasks, such as like managing upgrades and reporting the state/health of the ISA 514 to the controller 532.

In some embodiments, the off-box entity application 522 is provided by another ISA installed on the server 520 or through a software module running on the server 520. In some embodiments, the provided off-box service: 1) makes decisions for traffic forwarding while the ISA is undergoing an upgrade, 2) accepts configuration from north-bound controller during upgrade window, 3) sync-configuration state from the ISA during upgrade, and 4) accepts traffic from the ISA and return back the traffic after applying necessary policies. In some embodiments, the off-box service is reachable by the ISA 512 via a configuration applied before the upgrade is initiated by the controller 532.

In some embodiments, the described system is employed upgrade the firmware/code on an ISA 512 without using the off-box entity application 522. In such embodiments, the forwarding tables and assembly programs are stored in SRAM/TCAM/HBM memory on the ISA 512. Each of these memories are split into at least two partitions that include an active and standby partition. In some embodiments, the active partition is employed to store all the above information and assist in forwarding decisions. In some embodiments, the standby partition is employed to create new state for post-upgrade partition. In instances when the ISA firmware upgrade does not have any forwarding data-structure changes, the active forwarding state partition can continue being used during the upgrade. In some embodiments, the active forwarding tables includes entries in a traffic flow table for each respective flow. For example, an entry may include information related to a respective flow as well as information about where the offsets for respective assembly programs are in the HBM memory. In some embodiments, when the state in the standby partition is generated (for the upgrade) the program offsets are altered so that the new entries are pointing to the new programs loaded in, for example, the HBM post-upgrade.

Example Processes

FIGS. 6A and 6B each depict a flowchart of an example process 600 and 650 respectively. The example processes 600 and 650 can be implemented by the various elements of the described zero-packet-loss upgrade system. As depicted, the example processes show in more detail how the firmware/code on a programmable IO device (e.g., an ISA) can be upgraded without having to reload the host on which the programmable IO device resides, with minimal or no packet loss whatsoever, and no disruption to service. Process 600 is implemented by employing an off-box service, such as depicted in FIG. 5, and ensures that there is no packet loss. Process 650 is implemented in the absence of an off-box service. This alternative approach (process 650) can be implemented through a partition of the resources (e.g., memory) on the programmable IO device. Minimal packet loss can occur in process 650 only during the small window when the partitions are switched.

For clarity of presentation, the description that follows generally describes the example processes 600 and 610 in the context of FIGS. 1-5, 7, and 8. However, it will be understood that the processes 600 and 610 may be performed, for example, by any other suitable system, environment, software, and hardware, or a combination of systems, environments, software, and hardware as appropriate. In some embodiments, various operations of the processes 600 and 650 can be run in parallel, in combination, in loops, or in any order.

For process 600 (depicted in FIG. 6A), at 602, a request to upgrade firmware is received from a north-bound entity, such the controller 532 from FIG. 5. For example, the north-bound entity initiates an upgrade (e.g., provides the request) via a controller agent running on at least one CPU cores (e.g., the ARM processors described in FIG. 2) of the programmable IO device to be upgraded. In some embodiments, the process 600 is executed by the controller agent running on the programmable IO device. In some embodiments, the process 600 is executed via an API provided by an SDK. In some embodiments, the north-bound entity is provided by a server device. In some embodiments, the server device providing the north-bound entity does not comprise the programmable IO device. In some embodiments, the firmware is installed on the programmable IO device (e.g., in a memory unit). From 602, the process 600 proceeds to 604.

At 604, flow-miss traffic to the programmable IO device is disabled. From 604, the process 600 proceeds to 606.

At 606, the flow-miss traffic is redirected to an off-box service, such as the off-box entity 522 depicted in FIG. 5. In some embodiments, disabling the flow-miss traffic to the programmable IO device and redirecting the flow-miss traffic to the off-box service are performed as an atomic operation. In some embodiments, the off-box service is provided by a server device. In some embodiments, the server device providing the off-box service does not comprise the programmable IO device. In some embodiments, the server device providing the north-bound entity also provides the off-box service. From 606, the process 600 proceeds to 608.

At 608, a configuration for the programmable IO device is provided to the off-box service. In some embodiments, the configuration comprises entries from a stateful table and entries from a stateless table. In some embodiments, before the configuration is provided to the off-box service, the entries from either the stateful table or the stateless table are fetched. In some embodiments, the entries from either the stateful table or the stateless table are provided in a well-defined format, such as JavaScript Object Notation (JSON), Extensible Markup Language (XML), or key value pairs. In some embodiments, the stateless table can be rebuilt with a configuration fetched from the controller. From 608, the process 600 proceeds to 610.

At 610, traffic (e.g., received by the programmable IO device) is redirected to the off-box service. From 610, the process 600 proceeds to 612.

At 612, the firmware installed on the at least one CPU core is updated. In some embodiments, after the firmware is updated, at least one program running in the data plane is upgraded. From 612, the process 600 proceeds to 614.

At 614. a forwarding state provided by the off-box service is reprogramed. In some embodiments, the forwarding state comprises hardware tables that are saved in SRAM, TCAM, or HBM. In some embodiments, the forwarding state comprises assembly programs loaded in HBM program memory. In some embodiments, the forwarding state is reprogrammed into the programmable IO device once the controller agent has finished upgrading the data plane programs. From 614, the process 600 proceeds to 616.

At 616, the redirection of the traffic to the off-box service is disabled. From 616, the process 600 proceeds to 618.

At 618, a notification indicating a completion of the upgrade of the firmware is provided to the north-bound entity. In some embodiments, a redirecting program running in the data plane responsible for redirecting traffic to the off-box service and traffic received from the off-box service to a network is not affected during the execution of the process 600. In some embodiments, the redirecting program is upgraded after the process. In some embodiments, status updates regarding the upgrade of the firmware are periodically providing to the north-bound entity. In some embodiments, the updates are provided every second to the north-bound entity. In some embodiments, the updates are provided every ten seconds to the north-bound entity. In some embodiments, the updates are provided every minute to the north-bound entity. In some embodiments, the updates are provided to track the health of the programmable IO device during the upgrade. In some embodiments, the north-bound entity is configured to trigger the off-box service to start managing the traffic forwarding and to accept in-coming configurations when a fault state is detected based on the provided status updates. From 618, the process 600 ends.

Any of the above control plane processes can crash or become unresponsive for any reason rendering the ISA to be in a fault state. Therefore, in some embodiments, to ensure recovery of the system and bring it back to working state, the north-bound entity keeps a track of the health of the system. For example, a heartbeat can be maintained within the ISA and/or between the ISA and the north-bound entity. In some embodiments, when a fault state is detected, the north-bound entity can trigger the off-box service to start managing the traffic forwarding and to accept in-coming configurations. In some embodiments, during this time, the north-bound entity can allow the ISA to bring itself back to a working state. For example, the ISA may bring itself back to a working state by bring the processes back up and restoring previous states within the processes. The ISA may also sync with the north-bound entity as described above.

For process 650 (depicted in FIG. 6B), a memory unit of the IO device is partitioned into a standby partition and an active partition. In some embodiments, the active partition includes resources used by a forwarding plane to assist with forwarding decisions. In some embodiments, the partitions are maintained for forwarding state and any other program memory on the programmable IO device. In some embodiments, the memory unit comprises SRAM, TCAM, or HBM, partitioned into the standby partition and the active partition. The process 650 described may have some traffic disruption/loss. However, it should be minimal as the work done in the disruption window includes fixing the program offsets on the ISA to point to the base of new programs.

At 652, a firmware update is loaded to the standby partition. From 652, the process 650 proceeds to 654.

At 654, a request to upgrade to the firmware update is received from a north-bound entity, such the controller 532 from FIG. 5. For example, the north-bound entity initiates an upgrade (e.g., provides the request) via a controller agent running on at least one CPU cores (e.g., the ARM processors described in FIG. 2) of the programmable IO device to be upgraded. In some embodiments, the process 650 is executed by the controller agent running on the programmable IO device. In some embodiments, the process 650 is executed via an API provided by an SDK. In some embodiments, the north-bound entity is provided by a server device. In some embodiments, the server device providing the north-bound entity does not comprise the programmable IO device.

From 654, the process 650 proceeds to 656.

At 656, a forwarding state is programmed to the standby partition. From 656, the process 650 proceeds to 658.

At 658, incoming configuration updates are disabled. From 658, the process 650 proceeds to 660.

At 660, the forwarding plane is quiesced. From 660, the process 650 proceeds to 662.

At 662, program pointers are reprogramed to reference to the firmware update and the network state stored to the standby partition. From 662, the process 650 proceeds to 664.

At 664, the forwarding plane un-quiesced. In some embodiments, the resources used by the forwarding plane comprise forwarding tables and ASM programs. In some embodiments, the active forwarding tables includes entries in a traffic flow table for each respective flow. In some embodiments, an entry in one of the forwarding tables includes include information related to a respective flow. In some embodiments, entries in the forwarding tables include information regarding a location of an offset for a respective assembly program. In some embodiments, the firmware update does not have any forwarding data-structure changes, the active partition is used instead of the standby partition during the execution of the operations. From 664, the process 650 proceeds to 666.

At 666, incoming configuration updates are enabled. From 666, the process 650 ends.

Computer Systems

Figure 7:
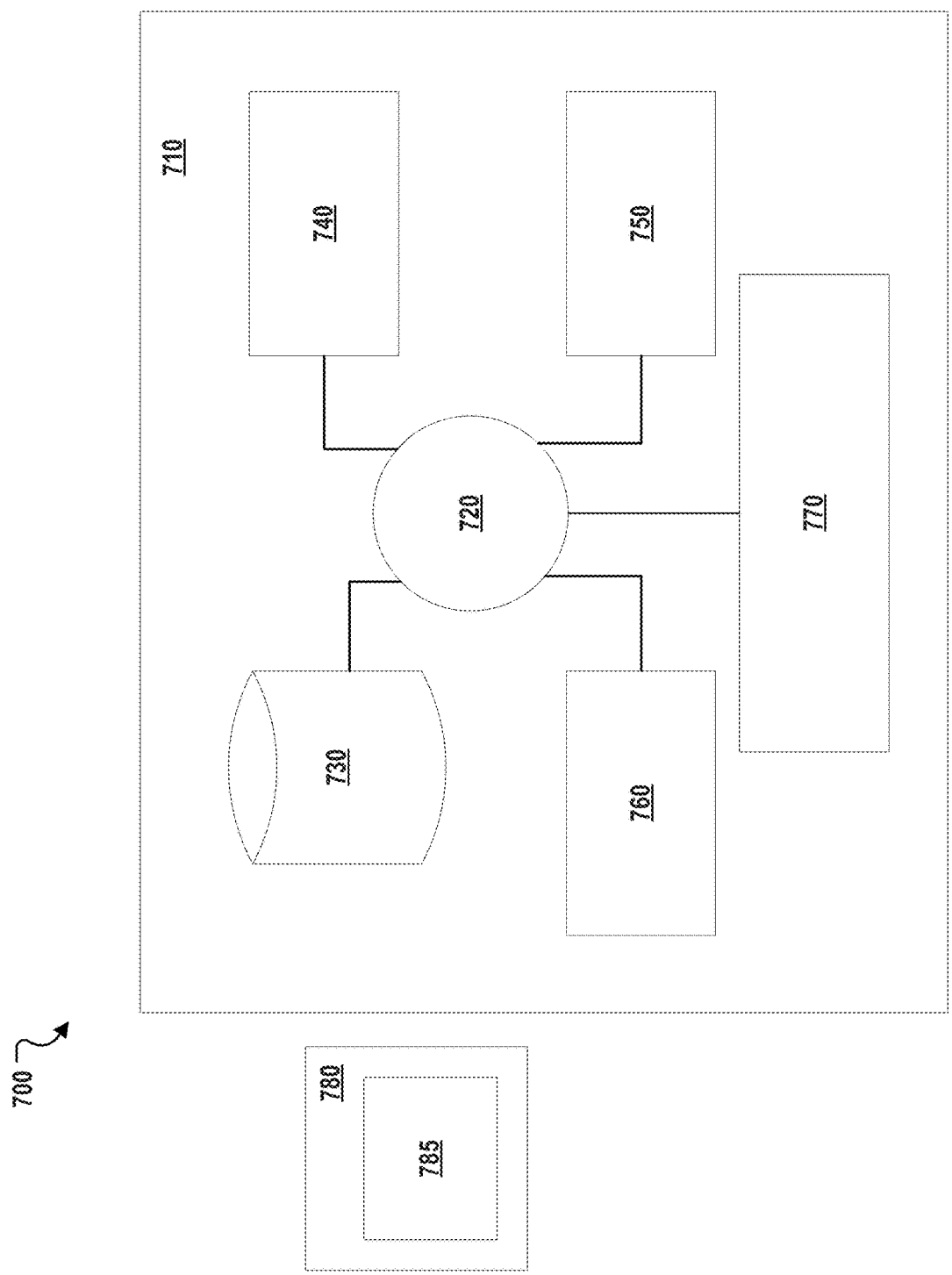
FIG. 7 depicts a non-limiting example computer system that can be programmed or otherwise configured to implement methods or systems of the present disclosure.

Computer systems are provided herein that can be used to implement methods or systems of the disclosure. FIG. 7 depicts an example a computer system 700 that can be programmed or otherwise configured to implement methods or systems of the present disclosure. For example, the computing device 710 can be programmed or otherwise configured upgrade the IO subsystem 770 (e.g., an ISA) with no packet loss by employing an off-box service. As depicted, the computer system 700 includes a computing device 710 and an optional electronic display 780. In some embodiments, the computing device 710 is substantially similar to the computing system 120 depicted in FIG. 1.

In the depicted embodiment, the computing device 710 includes a CPU (also "processor" and "computer processor" herein) 720, which is optionally a single core, a multi core processor, or a plurality of processors for parallel processing. The computing device 710 also includes memory or memory location 730 (e.g., random-access memory, read-only memory, flash memory); electronic storage unit 740 (e.g., hard disk); communication interface 750 (e.g., network adapter) for communicating with one or more other systems; peripheral devices 760 (e.g., cache, other memory, data storage or electronic display adapters), and IO subsystem 770 (e.g., an IO device, such as a smartNIC). The memory 730, the electronic storage unit 740, the communication interface 750, the peripheral devices 760, and the IO subsystem 770 are in communication with the CPU 720 through a communication bus (solid lines), such as a motherboard.

In some embodiments, the CPU 720 can execute a sequence of machine-readable instructions, which can be embodied in a program or software. The instructions may be stored in a memory location, such as the memory 730. The instructions can be directed to the CPU 720, which can subsequently program or otherwise configure the CPU 720 to implement methods of the present disclosure. Examples of operations performed by the CPU 720 can include fetch, decode, execute, and write back. In some embodiments, the CPU 720 is part of a circuit, such as an integrated circuit. One or more other components of the computing device 710 can be optionally included in the circuit. In some embodiments, the circuit is an ASIC or a Field Programmable Gate Array (FPGA).

In some embodiments, the IO subsystem 770 (e.g., the above described IO device) comprises an expansion card, such as a smartNIC, that is connected with the CPU 720 via PCIe. In some embodiments, the IO subsystem 770 is completely programmable ASIC engine. In some embodiments, an ASIC engine is tailored to a specific subset of functions, such as compression and checksum, while another engine is dedicated for symmetric cryptography.

In some embodiments, the electronic storage unit 740 includes a data storage unit (or data repository) for storing data. In some embodiments, the electronic storage unit 740 stores files, such as drivers, libraries, images, and saved programs. In some embodiments, the electronic storage unit 740 stores user data, e.g., user preferences and user programs. In some embodiments, the computing device 710 includes one or more additional data storage units that are external, such as located on a remote server that is in communication through an intranet or the internet.

Figure 8:
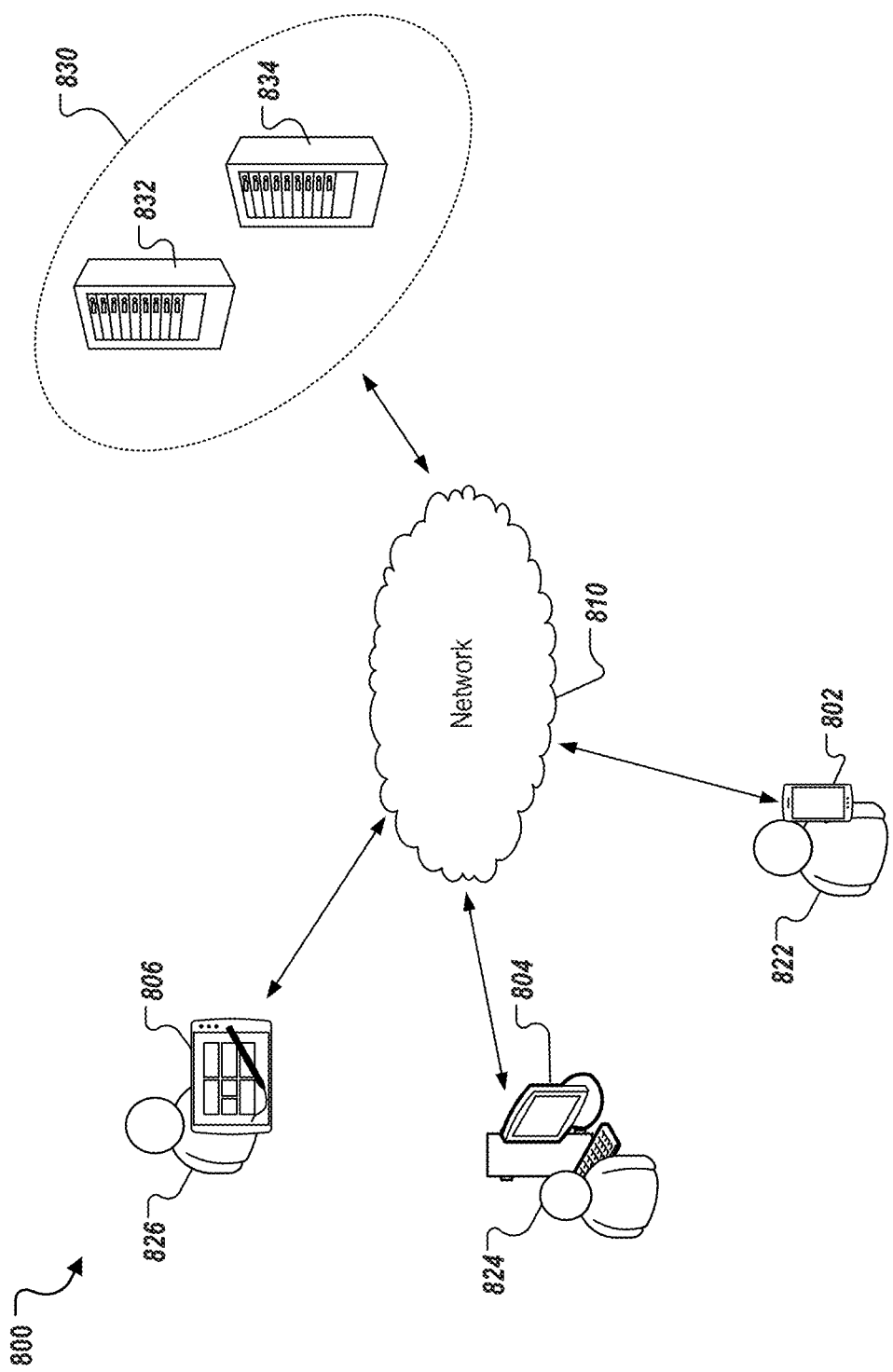
FIG. 8 depicts a non-limiting example environment where implementations of the present disclosure can be employed.

The computing device 710 is optionally operatively coupled to a network, such as the network 810 depicted and described in FIG. 8, with the aid of the communication interface 750. In some embodiments, the computing device 710 communicates with one or more remote computer systems through the network. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants. In some embodiments, a user can access the computing device 710 via a network.

In some embodiments, methods as described herein are implemented by way of machine (e.g., computer processor) executable code stored on an electronic storage location of the computing device 710, such as, for example, on the memory 730 or the electronic storage unit 740. In some embodiments, the CPU 720 is adapted to execute the code. In some embodiments, the machine executable or machine-readable code is provided in the form of software. In some embodiments, during use, the code is executed by the CPU 720. In some embodiments, the code is retrieved from the electronic storage unit 740 and stored on the memory 730 for ready access by the CPU 720. In some situations, the electronic storage unit 740 is precluded, and machine-executable instructions are stored on the memory 740. In some embodiments, the code is pre-compiled. In some embodiments, the code is compiled during runtime. The code can be supplied in a programming language that can be selected to enable the code to execute in a pre-compiled or as-compiled fashion.

In some embodiments, the computing device 710 can include or be in communication with the electronic display 780. In some embodiments, the electronic display 780 provides a user interface (UI) 785.

Example Environment

FIG. 8 depicts an example environment 800 that can be employed to execute implementations of the present disclosure. The example system 800 includes computing devices 802, 804, and 806; a back-end system 830; and a network 810.

In some embodiments, the network 810 includes a local area network (LAN), wide area network (WAN), the Internet, or a combination thereof, and connects web sites, devices (e.g., the computing devices 802, 804, and 806) and back-end systems (e.g., the back-end system 830). In some embodiments, the network 810 includes the Internet, an internet, and/or extranet, or an intranet and/or extranet that is in communication with the Internet. In some embodiments, the network 810 includes a telecommunication and/or data network. In some embodiments, the network 810 can be accessed over a wired and/or a wireless communications link. For example, mobile computing devices (e.g., the smartphone device 802 and the tablet device 806), can use a cellular network to access the network 810.

In the depicted example environment 800, the back-end system 830 includes server devices 832 and 834, which can be employed to provide the described zero-packet-loss upgrade system. In some embodiments, the back-end system 830 may be deploy within a data center that provides services, such as a web service, the computing devices 802, 804, and 806. The described zero-packet-loss upgrade system may be employed within the example environment 800 to upgrade the firmware or code on the ISAs installed on either server devices 832 or 834. For example, when upgrading the firmware for an ISA installed on the service device 832, an off-box service can be provided via the service device 834, and vice versa when upgrading the firmware on an ISA installed on the service device 834.

In some embodiments, back-end system 830 includes computer systems using clustered computers and components to act as a single pool of seamless resources when accessed through the network 810. For example, such implementations may be used in data center, cloud computing, storage area network (SAN), and network attached storage (NAS) applications. In some embodiments, the servers 832 and 834 hosts one or more computer-implemented services with which users 822, 824, and 826 can interact using the respective computing devices 802, 804, and 806.

In some embodiments, the server devices 832 and 834 are each sustainably similar to the computing device 710 depicted in FIG. 7 as well as the servers 510 and 520 depicted in FIG. 5 depending on how the server devices 832 and 834 are being used within the described system (e.g., which server device includes the ISA whose firmware is being upgraded). In some embodiments, the server devices 832 and 834 are server-class hardware type devices. In some embodiments, back-end system 830 is deployed using a virtual machine(s) that can be employed to provide the off-box service for an ISA whose firmware is being upgraded.

In some examples, the users 822, 824, and 826 interact with the services provided by the back-end system 830 through a graphical user interface (GUI) or application that is installed and executing on their respective computing devices 802, 804, and 806. In some examples, the computing devices 802, 804, and 806 provide viewing data to screens with which the users 822, 824, and 826 can interact. In some embodiments, the computing devices 802, 804, 806, and 832 are sustainably similar to computing device 710 depicted in FIG. 7. The computing devices 802, 804, 806 may each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In the depicted example, the computing device 802 is a smartphone, the computing device 804 is a tablet-computing device, and the computing device 806 is a desktop computing device. Three user computing devices 802, 804, and 806, are depicted in FIG. 8 for simplicity. It is contemplated, however, that implementations of the present disclosure can be realized with any of the appropriate computing devices, such as those mentioned previously. Moreover, implementations of the present disclosure can employ any number of devices as required.

Processing Devices and Processors

In some embodiments, the platforms, systems, media, and methods described herein include a computer, or use of the same. In further embodiments, the computer includes one or more hardware CPUs or general purpose graphics processing units (GPGPUs) that carry out the device's functions by providing chains of operation to an IO subsystem provided through a SmartNIC connected to the CPU or GPGPU via PCIe. In still further embodiments, the computer comprises an operating system configured to perform executable instructions. In some embodiments, the computer is optionally connected a computer network. In further embodiments, the computer is optionally connected to the Internet such that it accesses the World Wide Web. In still further embodiments, the computer is optionally connected to a cloud computing infrastructure. In other embodiments, the computer is optionally connected to an intranet. In other embodiments, the computer is optionally connected to a data storage device.

In accordance with the description herein, suitable computers include, by way of non-limiting examples, server computers, desktop computers, laptop computers, notebook computers, sub-notebook computers, netbook computers, netpad computers, handheld computers, Internet appliances, mobile smartphones, tablet computers, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the computer is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, compact disc (CD)-Read only Memories (ROMs), Digital Versatile Disks (DVDs), flash memory devices, magnetic disk drives, magnetic tapes drives, optical disk drives, and cloud computing-based storage. In further embodiments, the storage and/or memory device is a combination of devices such as those disclosed herein.

Non-Transitory Computer Readable Storage Medium

In some embodiments, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. In some embodiments, a computer program includes a sequence of instructions, executable in the computer's CPU or in the processors of an IO subsystem, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

While preferred embodiments of the present subject matter have been shown and described herein, it will be obvious to those skilled in the art that such embodiments are provided by way of example only. Numerous variations, changes, and substitutions will now occur to those skilled in the art without departing from the described system. It should be understood that various alternatives to the embodiments of the subject matter described herein may be employed in practicing the described system.

What is claimed is:

1. A programmable input output (TO) device comprising:
   at least one central processing unit (CPU) core; and
   a memory unit, the memory unit having instructions stored thereon which, when executed by the programmable IO device, cause the programmable IO device to perform operations comprising:
      receiving, from a north-bound entity, a request to upgrade firmware installed on the programmable IO device;
      disabling flow-miss traffic to the programmable IO device;
      redirecting the flow-miss traffic to an off-box service;
      providing a configuration for the programmable IO device to the off-box service;
      redirecting traffic to the off-box service;
      updating the firmware installed on the programmable IO device;
      reprograming a forwarding state provided by the off-box service;
      disabling the redirection of the traffic to the off-box service; and
      providing, to the north-bound entity, a notification indicating a completion of the upgrade of the firmware.

2. The programmable IO device of claim 1, wherein the programmable IO device comprises an intelligent server adapter (ISA) or a smart network interface card (smartNIC).

3. The programmable IO device of claim 1, wherein the operations are executed through a controller agent running on one of the CPU cores.

4. The programmable IO device of claim 3, wherein the operations are executed via an application programing interface (API) provided by a software development kit (SDK).

5. The programmable IO device of claim 1, wherein the off-box service is provided by a server device.

6. The programmable IO device of claim 5, wherein the server device does not comprise the programmable IO device.

7. The programmable IO device of claim 1, wherein the north-bound entity comprises a controller.

8. The programmable IO device of claim 7, wherein the controller is provided by a server device.

9. The programmable IO device of claim 8, wherein the server device does not comprise the programmable IO device.

10. The programmable IO device of claim 9, wherein the off-box service is provided by the server device.

11. The programmable IO device of claim 1, wherein the configuration comprises entries from a stateful table and entries from a stateless table.

12. The programmable IO device of claim 11, wherein the operations comprise:
    before providing the configuration to the off-box service, fetching the entries from either the stateful table or the stateless table.

13. The programmable IO device of claim 11, wherein the entries from either the stateful table or the stateless table are provided in a well-defined format.

14. The programmable IO device of claim 1, wherein a redirecting program running in the data plane responsible for redirecting traffic to the off-box service and traffic received from the off-box service to a network is not affected during the execution of the operations.

15. The programmable IO device of claim 14, wherein the redirecting program is upgraded after the execution the operations.

16. The programmable IO device of claim 1, wherein the operations comprise:
    periodically providing, to the north-bound entity, status updates regarding the upgrade of the firmware to track the health of the programmable IO device during the upgrade.

17. The programmable IO device of claim 16, wherein the north-bound entity is configured to trigger the off-box service to start managing the traffic forwarding and to accept in-coming configurations when a fault state is detected based on the provided status updates.

18. The programmable IO device of claim 1, wherein disabling the flow-miss traffic to the programmable IO device and redirecting the flow-miss traffic to the off-box service are performed as an atomic operation.

19. The programmable IO device of claim 1, wherein the firmware is stored in the memory unit before receiving the request to upgrade the firmware.

20. The programmable IO device of claim 1, wherein the forwarding state comprises hardware tables that are saved in static random access memory (SRAM), ternary content addressable memory (TCAM), or high bandwidth memory (HBM).

21. The programmable IO device of claim 20, wherein the forwarding state comprises assembly programs loaded in HBM program memory.

22. The programmable IO device of claim 1, wherein the operations comprise:
    after updating the firmware, upgrading at least one program running in the data plane.

23. The programmable IO device of claim 1, wherein the at least one CPU core comprises an advanced RISC machine (ARM) processor.

24. A method for upgrading firmware on a programmable input output (TO) device, the method being executed by the programmable IO device and comprising:
- receiving, from a north-bound entity, a request to upgrade firmware installed on the programmable IO device;
- disabling flow-miss traffic to the programmable IO device;
- redirecting the flow-miss traffic to an off-box service;
- providing a configuration for the programmable TO device to the off-box service;
- redirecting traffic to the off-box service;
- updating the firmware installed on the programmable TO device;
- reprograming a forwarding state provided by the off-box service;
- disabling the redirection of the traffic to the off-box service; and
- providing, to the north-bound entity, a notification indicating a completion of the upgrade of the firmware.

25. A zero-packet-loss upgrade system, comprising:
- a north-bound entity;
- an off-box service; and
- a programmable input output (TO) device configured to execute instructions that cause the programmable TO device to perform operations comprising:
  - receiving, from the north-bound entity, a request to upgrade firmware installed on the programmable TO device;
  - disabling flow-miss traffic to the programmable TO device;
  - redirecting the flow-miss traffic to an off-box service;
  - providing a configuration for the programmable TO device to the off-box service;
  - redirecting traffic to the off-box service;
  - updating the firmware installed on the programmable TO device;
  - reprograming a forwarding state provided by the off-box service;
  - disabling the redirection of the traffic to the off-box service; and
  - providing, to the north-bound entity, a notification indicating a completion of the upgrade of the firmware.

26. A programmable input output (TO) device comprising:
- at least one central processing unit (CPU) core; and
- a memory unit partitioned into a standby partition and an active partition, wherein the active partition comprises resources used by a forwarding plane to assist with forwarding decisions; the memory unit having instructions stored thereon which, when executed by the programmable IO device, cause the programmable IO device to perform operations comprising:
  - loading a firmware update to the standby partition;
  - receiving, from a north-bound entity, a request to upgrade to the firmware update;
  - programing a forwarding state to the standby partition;
  - disabling incoming configuration updates;
  - quiescing the forwarding plane;
  - reprograming program pointers to reference to the firmware update and a network state stored to the standby partition;
  - un-quiescing the forwarding plane; and
  - enabling incoming configuration updates.

27. The programmable IO device of claim 26, wherein the programmable IO device comprises an intelligent server adapter (ISA) or a smart network interface card (smartNIC).

28. The programmable IO device of claim 26, wherein the north-bound entity comprises a controller.

29. The programmable IO device of claim 28, wherein the forwarding state is managed by the controller via a controller agent.

30. The programmable IO device of claim 28, wherein the controller is provided by a server device.

31. The programmable IO device of claim 30, wherein the server device does not comprise the programmable IO device.

32. The programmable IO device of claim 26, wherein the resources used by the forwarding plane comprise forwarding tables and assembly programs.

33. The programmable TO device of claim 32, wherein the active forwarding tables includes entries in a traffic flow table for each respective flow.

34. The programmable TO device of claim 32, wherein an entry in one of the forwarding tables includes include information related to a respective flow.

35. The programmable TO device of claim 32, wherein entries in the forwarding tables include information regarding a location of an offset for a respective assembly program.

36. The programmable TO device of claim 26, wherein the memory unit comprises: static random access memory (SRAM), ternary content addressable memory (TCAM), or high bandwidth memory (HBM), partitioned into the standby partition and the active partition.

37. The programmable TO device of claim 26, wherein when the firmware update does not have any forwarding data-structure changes, the active partition is used instead of the standby partition during the execution of the operations.

38. A method for upgrading firmware on a programmable input output (TO) device, the method being executed by the programmable TO device and comprising:
- loading a firmware update to a standby partition of a memory unit, the memory unit partitioned into the standby partition and an active partition, wherein the active partition comprises resources used by a forwarding plane to assist with forwarding decisions;
- receiving, from a north-bound entity, a request to upgrade to the firmware update;
- programing a forwarding state to the standby partition;
- disabling incoming configuration updates;
- quiescing the forwarding plane;
- reprograming program pointers to reference to the firmware update and a network state stored to the standby partition;
- un-quiescing the forwarding plane; and
- enabling incoming configuration updates.

39. The programmable IO device of claim 1, wherein the programmable IO device comprises a router or switch.

40. The programmable IO device of claim 26, wherein the programmable IO device comprises a router or switch.

* * * * *

UNITED STATES PATENT AND TRADEMARK OFFICE
CERTIFICATE OF CORRECTION

Page 1 of 2

PATENT NO. : 11,182,150 B2
APPLICATION NO. : 16/742631
DATED : November 23, 2021
INVENTOR(S) : Alok Rathore et al.

It is certified that error appears in the above-identified patent and that said Letters Patent is hereby corrected as shown below:

In the Claims

Claim 1, Column 33, Line 35: Replace "TO" with --IO--

Claim 24, Column 35, Line 2: Replace "TO" with --IO--

Claim 24, Column 35, Line 9: Replace "TO" with --IO--

Claim 24, Column 35, Line 12: Replace "TO" with --IO--

Claim 25, Column 35, Line 23: Replace "TO" with --IO--

Claim 25, Column 35, Line 24: Replace "TO" with --IO--

Claim 25, Column 35, Line 27: Replace "TO" with --IO--

Claim 25, Column 35, Line 29: Replace "TO" with --IO--

Claim 25, Column 35, Line 32: Replace "TO" with --IO--

Claim 25, Column 35, Line 36: Replace "TO" with --IO--

Claim 26, Column 35, Line 44: Replace "TO" with --IO--

Claim 33, Column 36, Line 20: Replace "TO" with --IO--

Claim 34, Column 36, Line 23: Replace "TO" with --IO--

Claim 35, Column 36, Line 26: Replace "TO" with --IO--

Signed and Sealed this
Eighteenth Day of January, 2022

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,182,150 B2

Claim 36, Column 36, Line 29: Replace "TO" with --IO--

Claim 37, Column 36, Line 34: Replace "TO" with --IO--

Claim 38, Column 36, Line 40: Replace "TO" with --IO--

Claim 38, Column 36, Line 41: Replace "TO" with --IO--